United States Patent
Weibel et al.

(10) Patent No.: US 8,985,547 B2
(45) Date of Patent: Mar. 24, 2015

(54) VALVES AND RESERVOIRS FOR MICROFLUIDIC SYSTEMS

(75) Inventors: Douglas B. Weibel, Arlington, MA (US); Andrew Lee, Somerville, MA (US); Scott Potenta, Boston, MA (US); Adam Siegel, Cambridge, MA (US); Maarten Kruithof, Delft (NL); George M. Whitesides, Newton, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 1759 days.

(21) Appl. No.: 11/883,260

(22) PCT Filed: Jan. 31, 2006

(86) PCT No.: PCT/US2006/003354
§ 371 (c)(1),
(2), (4) Date: Jan. 6, 2010

(87) PCT Pub. No.: WO2006/083833
PCT Pub. Date: Aug. 10, 2006

(65) Prior Publication Data
US 2010/0116343 A1 May 13, 2010

Related U.S. Application Data

(60) Provisional application No. 60/648,994, filed on Jan. 31, 2005.

(51) Int. Cl.
*F16K 7/04* (2006.01)
*F15B 1/04* (2006.01)
(Continued)

(52) U.S. Cl.
CPC ............. *F15B 1/04* (2013.01); *B01L 3/502738* (2013.01); *B01L 3/502746* (2013.01);
(Continued)

(58) Field of Classification Search
USPC .......... 251/8, 11, 120, 121, 264–278, 129.01, 251/129.11; 137/825, 829, 831; 422/502–508
See application file for complete search history.

(56) References Cited

U.S. PATENT DOCUMENTS 2,865,591 A * 12/1958 Holinshead ................ 251/8
3,167,085 A * 1/1965 Redmer ................ 137/315.07
(Continued)

FOREIGN PATENT DOCUMENTS

CH 320 482 A 3/1957
GB 196 323 A 4/1923
(Continued)

OTHER PUBLICATIONS

Grzybowski et al. "Electrostatic self-assembly of macroscopic crystals using contact electrification" *Nature*, vol. 1, (Apr. 2003) 241-245.
(Continued)

*Primary Examiner* — Craig Schneider
*Assistant Examiner* — Ian Paquette

(57) ABSTRACT

A microfluidic valve assembly includes a structure defining a microfluidic fluid path and an actuator that can be moved between different positions controlling flow through the channel. In one embodiment, the actuator can be threaded into at least a portion of the structure, and can be moved rotationally between a first position, causing relatively greater constriction of a microfluidic fluid path, and a second position causing relatively lesser constriction of the fluid path. Actuating the actuator, e.g., by rotation, can deform material between the valve and the fluid path, thereby constricting at least a portion of the underlying fluid path and regulating the flow of a fluid in the fluid path. In another aspect, the invention provides a reservoir into which fluid can be placed and from which fluid can be introduced into a microfluidic system. In one embodiment, the reservoir is expandable and thereby able to store fluid under pressure for delivery to a microfluidic system.

39 Claims, 14 Drawing Sheets

(51) Int. Cl.
*B01L 3/00* (2006.01)
*F16K 99/00* (2006.01)

(52) U.S. Cl.
CPC ........ *F16K 99/0001* (2013.01); *F16K 99/0026* (2013.01); *F16K 99/0034* (2013.01); *B01L 2200/0636* (2013.01); *B01L 2300/0867* (2013.01); *B01L 2400/0487* (2013.01); *B01L 2400/0655* (2013.01); *B01L 2400/082* (2013.01); *F15B 2201/21* (2013.01); *F15B 2201/305* (2013.01); *F15B 2201/4053* (2013.01); *F16K 2099/0074* (2013.01); *F16K 2099/0078* (2013.01); *F16K 2099/0084* (2013.01)
USPC .......... 251/8; 251/274; 251/129.01; 137/831; 422/502

(56) References Cited

U.S. PATENT DOCUMENTS

| | | | |
|---|---|---|---|
| 3,497,175 A * | 2/1970 | Koland | 251/9 |
| 3,588,034 A * | 6/1971 | Powell | 251/8 |
| 4,354,666 A * | 10/1982 | McHale | 251/335.2 |
| 5,197,708 A * | 3/1993 | Campau | 251/8 |
| 5,316,262 A * | 5/1994 | Koebler | 251/8 |
| 5,932,799 A | 8/1999 | Moles | |
| 6,260,818 B1 | 7/2001 | Grummon | |
| 6,453,928 B1 | 9/2002 | Kaplan et al. | |
| 6,523,559 B2 | 2/2003 | Beebe et al. | |
| 6,581,899 B2 | 6/2003 | Williams | |
| 6,626,417 B2 | 9/2003 | Winger et al. | |
| 6,629,820 B2 * | 10/2003 | Kornelsen | 417/53 |
| 6,637,463 B1 | 10/2003 | Lei et al. | |
| 6,644,944 B2 | 11/2003 | Karp | |
| 7,004,447 B2 * | 2/2006 | Meyers | 251/81 |
| 2002/0029814 A1 | 3/2002 | Unger et al. | |
| 2002/0098122 A1 | 7/2002 | Singh et al. | |
| 2002/0117517 A1 | 8/2002 | Unger et al. | |
| 2002/0164816 A1 * | 11/2002 | Quake | 436/161 |
| 2002/0197167 A1 | 12/2002 | Kornelsen | |
| 2003/0132112 A1 | 7/2003 | Beebe et al. | |
| 2003/0196695 A1 | 10/2003 | O'Connor et al. | |
| 2003/0196714 A1 | 10/2003 | Gilbert et al. | |
| 2004/0037718 A1 | 2/2004 | Xie et al. | |
| 2004/0045891 A1 | 3/2004 | Gilbert et al. | |
| 2004/0115838 A1 | 6/2004 | Quake et al. | |
| 2004/0164265 A1 | 8/2004 | Killeen et al. | |
| 2004/0180377 A1 | 9/2004 | Manger et al. | |
| 2004/0200724 A1 | 10/2004 | Fujii et al. | |
| 2004/0209354 A1 | 10/2004 | Mathies et al. | |
| 2004/0228734 A1 | 11/2004 | Jeon et al. | |
| 2008/0249510 A1 * | 10/2008 | Mescher et al. | 604/890.1 |

FOREIGN PATENT DOCUMENTS

| | | |
|---|---|---|
| GB | 286 333 A | 3/1928 |
| GB | 120 3983 A | 9/1970 |
| GB | 214 9065 A | 6/1985 |
| JP | 59087254 A | 5/1984 |
| WO | WO 2004/065930 A2 | 5/2004 |
| WO | WO 2006/083833 A2 | 8/2006 |

OTHER PUBLICATIONS

Grzybowski et al. "Kinetics of contact electrification between metals and polymers" *Dept. of Chem. and Biol. Eng.*(Jun. 29, 2005).
Gu, et al., "Computerized microfluidic cell culture using elastomeric channels and Braille displays," *PNAS*, Nov. 9, 2004, vol. 101, No. 45, pp. 15861-15866.
Lee, et al., "Microfluidic valve with cored glass microneedle for microinjection," *Lab Chip*, 2003, vol. 3, pp. 164-167.
Papavasiliou et al. "High-speed and bi-stable electroylsis bubble actuated gate valves", Int'l Conf. on solid-state sensors and actuators, (Jun. 10, 2001) 094-943.
Studer, et al., "Scaling properties of a low-actuation pressure microfluidic value," *Journal of Applied Physics*, Jan. 1, 2004, vol. 95, No. 1, pp. 393-398.
Unger, et al., "Monolithic Microfabricated Valves and Pumps by Multilayer Soft Lithography," *Science*, Apr. 7, 2000, vol. 288, pp. 113-116.
Wiles et al. "A tool for studying contact electrification in systems comprising metals and insulating polymers" *Anal. Chem,.* vol. 75 (2003) 4859-4867.
Wiles et al. "Effects of surface modification and moisture on the rates of charge transfer between metals and organic materials" *J. Phys. Chem. B*, vol. 108, (2004) 20296-20302.
International Search Report and Written Opinion dated Oct. 5, 2006 in PCT/US2006/003354.

* cited by examiner

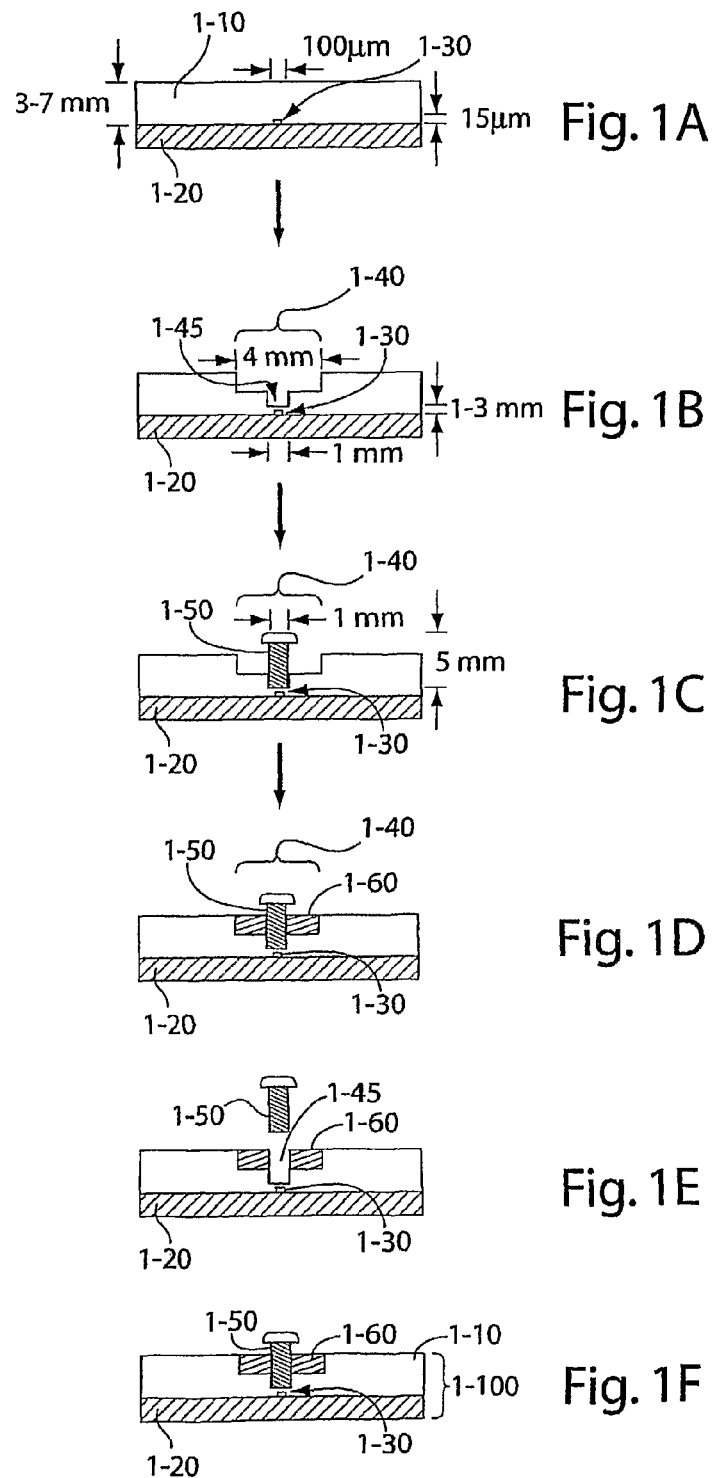

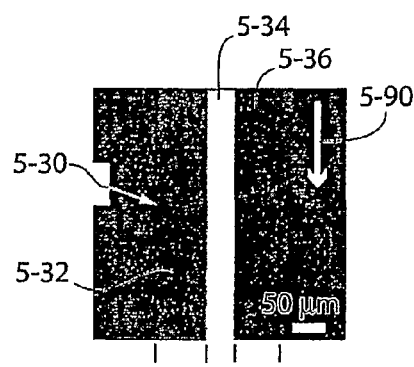
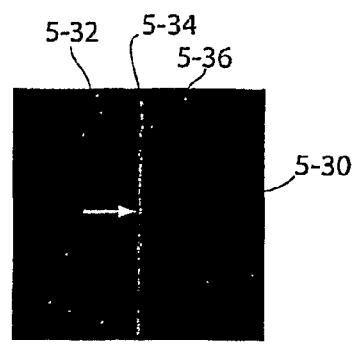
Fig. 5A Fig. 5B
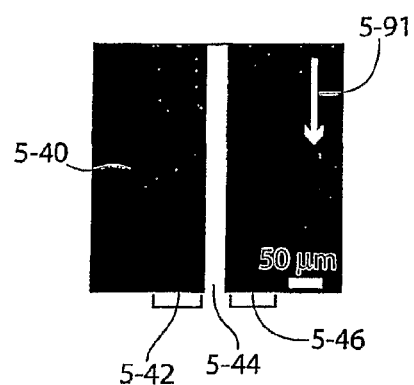
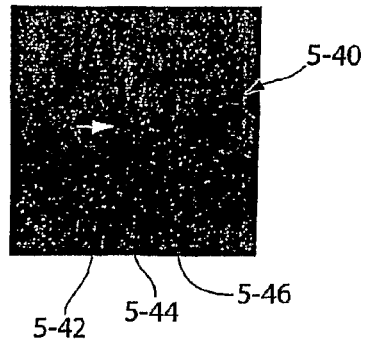
Fig. 5C Fig. 5D

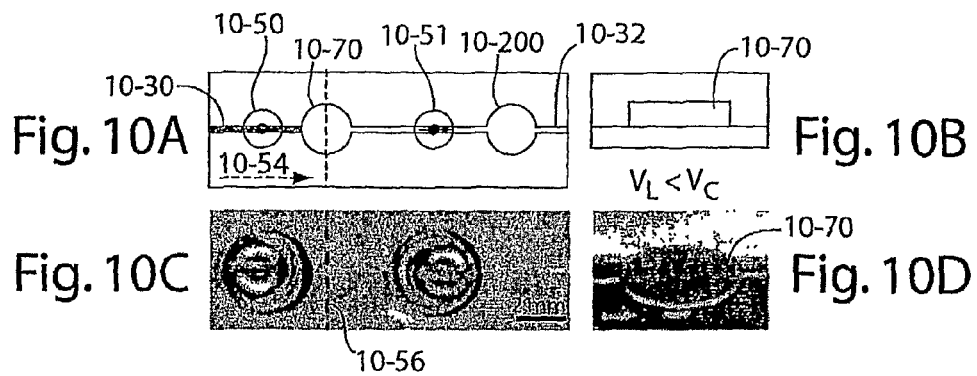
Fig. 10A Fig. 10B
Fig. 10C Fig. 10D
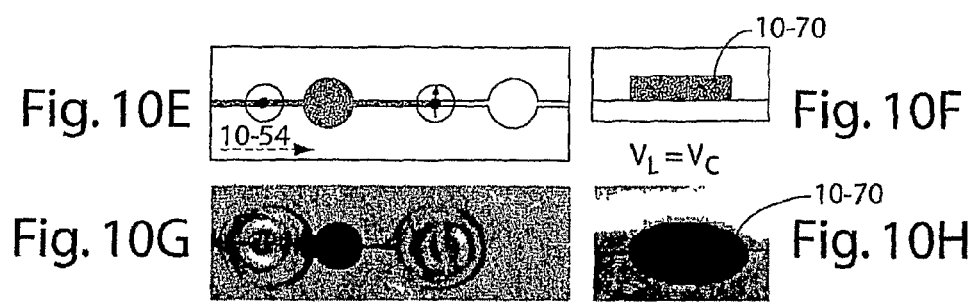
Fig. 10E Fig. 10F
Fig. 10G Fig. 10H
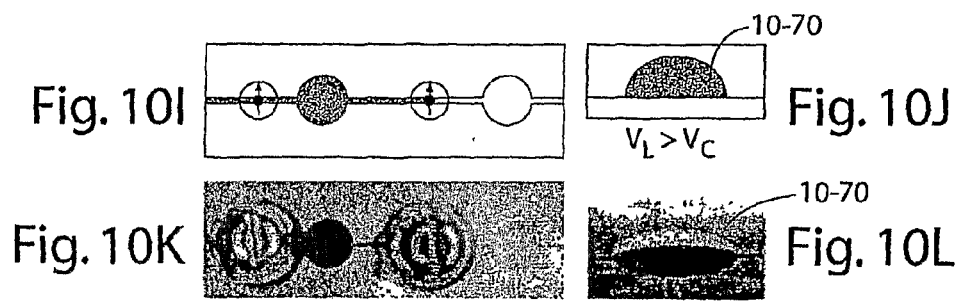
Fig. 10I Fig. 10J
Fig. 10K Fig. 10L
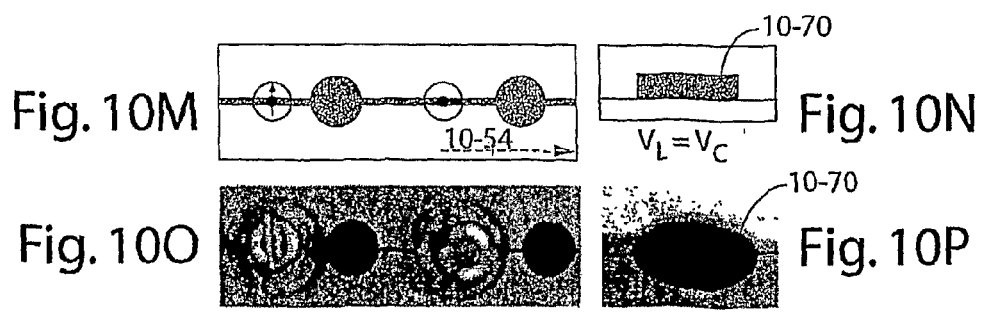
Fig. 10M Fig. 10N
Fig. 10O Fig. 10P

US 8,985,547 B2

VALVES AND RESERVOIRS FOR MICROFLUIDIC SYSTEMS

RELATED APPLICATIONS

This application is a U.S. National Stage application of and claims priority to PCT Application serial number PCT/US2006/003354, filed Jan. 31, 2006, entitled "Valves and Reservoirs for Microfluidic Systems", which claims priority to U.S. Provisional Application Ser. No. 60/648,994, filed Jan. 31, 2005, entitled "Valves and Reservoirs for Microfluidic Systems", each of which incorporated herein by reference in its entirety.

FEDERALLY SPONSORED RESEARCH

This invention was made with government support under DMR-0213805 and GM065364 awarded by National Institute of Health. The government has certain rights in the invention.

FIELD OF INVENTION

The invention relates to methods and apparatuses for controlling the flow of fluids in fluidic pathways.

BACKGROUND

Fluidic systems, including microfluidic systems, have found application in a variety of fields. These systems that typically involve controlled fluid flow through one or more microfluidic channels can provide unique platforms useful in both research and production. For instance, one class of systems can be used for analyzing very small amounts of samples and reagents on chemical "chips" that include very small fluid channels and small reaction/analysis chambers. Microfluidic systems are currently being developed for genetic analysis, clinical diagnostics, drug screening, and environmental monitoring. These systems can handle liquid or gas samples on a small scale, and are generally compatible with chip-based substrates. The behavior of fluid flow in these small-scale systems, therefore, is central to their development.

Methods for controlling fluid flow, for instance, delivering and pumping fluids and varying the flow rate of fluids, are an important aspect of microfluidics. These methods, however, typically require substantial capital equipment that can be expensive and/or bulky, thus limiting the portability of microfluidic devices. Advances in the field that could, for example, reduce costs and/or increase portability would find application in a number of different fields.

SUMMARY OF THE INVENTION

The invention relates to methods and apparatuses for controlling the flow of fluids in fluidic pathways.

In one embodiment, the present invention is directed to a microfluidic valve assembly, comprising a structure defining a microfluidic fluid path, and an actuator threaded into at least a portion of the structure, movable rotationally between at least a first position causing relatively greater constriction of the fluid path and a second position causing relatively lesser constriction of the fluid path.

In another embodiment, the present invention is directed to a microfluidic valve assembly, comprising a structure defining a microfluidic fluid path, and an actuator integrally connected to at least a portion of the structure, the actuator movable between at least a first position causing relatively greater constriction of the fluid path and a second position causing relatively lesser constriction of the fluid path, wherein the actuator, when moved to the second position, is able to remain in the second position without application of energy to the actuator and without being susceptible to variations in the operable working environment of the assembly.

In another embodiment, the present invention is directed to a microfluidic valve assembly, comprising a structure defining a microfluidic fluid path, a first portion and a second portion of the structure, each portion comprising a deformable material, wherein a distance between the first and second portions defines a cross-sectional dimension of the fluid path, and an actuator integrally connected to at least a portion of the structure, the actuator able to deform the first and second portions and constrict the microfluidic fluid path.

In another embodiment, the present invention is directed to a method of restricting flow in a microfluidic fluid path, comprising moving an actuator from a first position relative to a microfluidic fluid path, to a second position relative to the fluid path, wherein the second position causes more restriction of flow through the microfluidic fluid path than is caused by the first position, and maintaining the actuator in the second position without applying energy to the actuator, wherein the actuator is not susceptible to variations in the operable working environment of the assembly.

In another embodiment, the present invention is directed to a method of restricting flow in a microfluidic fluid path, comprising moving an actuator from a first position to a second position relative to the microfluidic fluid path thereby deforming at least a first and a second portion of a structure defining the fluid path, wherein a distance between the first and second portions defines a cross-sectional dimension of the microfluidic fluid path.

In another embodiment, the present invention is directed to a method of storing fluid in a microfluidic system, comprising urging a fluid into a reservoir via a first microfluidic fluid path thereby imparting, to the combination of the reservoir and fluid therein, potential energy, and closing a first valve disposed between the reservoir and the fluid path thereby storing the potential energy.

In another embodiment, the present invention is directed to a microfluidic fluid delivery system, comprising a reservoir containing a first fluid at a first pressure, a microfluidic fluid path in fluid communication with the reservoir, the fluid path containing a second fluid at a second pressure, wherein the second pressure is less than the first pressure, and a valve, disposed between the reservoir and the fluid path, which, when moved from a first position to a second position, allows at least a portion of the first fluid to flow from the reservoir to the microfluidic fluid path thereby causing the reservoir to have a pressure lower than the first pressure.

In another embodiment, the present invention is directed to a method of delivering fluid in a microfluidic system, comprising opening a valve disposed between a reservoir and a microfluidic fluid path, wherein the reservoir is defined by a first volume and contains a first fluid at a first pressure, and the fluid path contains a second fluid at a second pressure, the second pressure being less than the first pressure, and allowing the reservoir to contract from the first volume to a second volume less than the first volume thereby allowing at least a portion of the first fluid to flow from the reservoir to the fluid path.

In another embodiment, the present invention is directed to a microfluidic fluid delivery system, comprising a reservoir, defined by a first volume, containing a first fluid at a first pressure, a microfluidic fluid path in fluid communication with the reservoir, the microfluidic fluid path containing a second fluid at a second pressure, wherein the second pressure is less than the first pressure, and a valve, disposed between the reservoir and the fluid path, which, when moved from a first position to a second position, allows at least a portion of the first fluid to flow from the reservoir into the microfluidic fluid path thereby causing the reservoir to have a second volume, wherein the second volume is less than the first volume.

In another embodiment, the present invention is directed to a method, comprising establishing a flowing stream of a fluid, the stream including first and second components in contact with each other and defining therebetween a boundary, and changing a width of the first component by controlling a valve that is in fluid communication with the flowing stream.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures:

FIG. 5 illustrates, via black and white photocopies of fluorescent micrographs, focused streams of fluid in a microfluidic channel, according to one embodiment of the present invention;

FIGS. 9B-E illustrate, via black and white photocopies of fluorescent micrographs, the epifluorescence produced by the detection of an analyte using a sandwich immunoassay, according to one embodiment of the present invention;

FIG. 10 shows a schematic diagram a microfluidic pressure operated pump according to one embodiment of the invention;

DETAILED DESCRIPTION

Figure 1G:
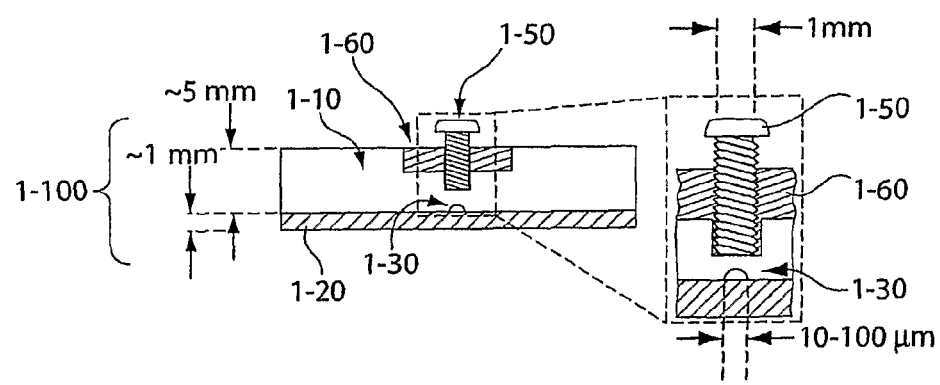
FIG. 1 illustrates a scheme for fabricating a microfluidic valve, according to one embodiment of the present invention.

The present invention includes methods and apparatuses for controlling the flow of fluids in microfluidic fluid paths. In one aspect of the invention, fluid flow can be controlled by restricting and/or directing flow in a microfluidic fluid path, using one or more valves that are in position to constrict at least a portion of the fluid path. Another aspect of the invention provides systems and methods of storing and delivering fluids in a microfluidic system.

In one aspect, a microfluidic valve assembly described herein includes a structure defining a microfluidic fluid path and an actuator which, for example, may be threaded into at least a portion of the structure. The actuator can be moveable rotationally between a first-position, causing relatively greater constriction of a microfluidic fluid path, and a second position causing relatively lesser constriction of the fluid path. The actuator may comprise, for example, small machine screws which, in one embodiment, can be embedded in a layer of polyurethane cast above a microfluidic fluid path fabricated in poly(dimethylsiloxane) (PDMS). The actuator may be separated from the ceiling of the fluid path by a deformable material, e.g., a layer of PDMS. Actuating the actuator, e.g., by rotation, can deform the PDMS layer between the valve and the fluid path, thereby constricting at least a portion of the underlying fluid path and regulating the flow of a fluid in the fluid path.

The valves disclosed herein can be easy to fabricate and operate. In addition, the valves may have other useful characteristics such as the following: they can partially constrict a fluid path, i.e., they can have settings in-between "on" and "off"; they may not require energy in maintaining their position, such as during "on", "off", and in-between settings; they can be easily integrated into portable and/or disposable microfluidic devices; and, they do not depend on external instrumentation. These virtues suggest that these valves may have advantages over certain conventional microfluidic valves, such as pneumatic valves, in particular applications (e.g., for portable and/or disposable devices and diagnostic devices for resource-poor settings).

A variety of definitions are now provided, which will aid in the understanding of the invention. Following is further disclosure including additional aspects and embodiments that will more fully describe the invention.

"Microfluidic channel system," as used herein, refers to a device, apparatus or system including at least one fluid path, at least a portion of which includes a cross-sectional dimension of less than 1 millimeter (mm).

"Fluid path," as used herein, refers to any channel, capillary, tube, pipe or pathway defined in a structure through which a fluid, such as a liquid, may pass. The fluid path can be microfluidic. "Fluid path", "flow path", and "channel" may be used interchangeably herein.

"Cross-sectional dimension," as used herein, refers to the shortest distance that can be measured between any two opposed points of a surface, or surfaces, of a fluid path.

"Fluid," as used herein, is defined by the property of being able to flow and can include a material that is in the liquid state or gaseous states. A fluid may comprise a suspension and/or an emulsion of particles, and/or reagent to be tested, such as a binding partner.

"Binding partner," as used herein, refers to a molecule that can undergo binding with a particular molecule. Biological binding partners are examples, e.g., protein A is a binding partner of the biological molecule IgG, and vice versa.

"Actuator", as used herein, refers to a mechanical device that may be moved. For example, an actuator may be moved to affect or control fluid flow. An actuator may be a component of a microfluidic valve assembly.

As used herein, the term "integrally connected," when referring to two or more objects, means objects that do not become separated from each other during the course of normal use, e.g., cannot be separated manually; separation requires at least the use of tools, and/or by causing damage to at least one of the components, for example, by breaking, peeling, etc. (separating components fastened together via adhesives, tools, etc.).

A chamber having a "parametric" shape, as used herein, refers to an outer boundary that is characterized by there being a first straight line segment, contained within the outer boundary, connecting two points on the outer boundary, and passing through the geometric center of the chamber, and a second straight line segment, perpendicular to the first line segment, contained within the outer boundary, connecting two points on the outer boundary—other than the same two points connected by the first line segment—and passing through the geometric center of the chamber.

In embodiments of the invention, a microfluidic channel system may be formed in a structure which may comprise any suitable material. Those of ordinary skill in the art can readily select a suitable material based upon, e.g., its inertness to (freedom from degradation by) a fluid to be passed through it, its robustness at a temperature at which a particular device is to be used, etc. In one embodiment of the invention, the structure is formed of a polymer. In some instances, the polymer may be an elastomer. In one particular embodiment, the elastomer comprises poly(dimethylsiloxane) (PDMS). In some cases, portions or all of the structure may be formed of a rigid polymer such as polystyrene, polycarbonate, or polyurethane, or a non-polymeric material such as silicon and glass. Multiple materials can be used to form the structure. For example, a block of material can include passageways therethrough lined with a second material defining channels.

The structure in which the microfluidic channel system is formed may have any suitable structure. For instance, if desired, the structure can be in the form of a block, a membrane, a tube, or the like.

In one embodiment, a first fluid flow path within a structure can optionally comprise a series of channels, at least some of which may be interconnected. In some embodiments, a second fluid flow path can be present within the microfluidic channel system. The second fluid flow path can, in some cases, be fluidically interconnected with the first fluid path, and may lie on the same or a different plane as the first fluid path.

It is noted that the channels need not be straight, but can follow a non-linear path such as a curved, serpentine, zig-zag, or other path shape. The fluid flow paths, or a portion of the paths, may be microfluidic. In some embodiments, the maximum cross-sectional dimension of the fluid flow path is less than about 1 millimeter (mm) in some cases, less than about 500 microns, less than about 300 microns, less than about 100 microns, less than about 50 microns, less than about 30 microns, less than about 10 microns, less than about 3 microns, or less than about 1 micron in other cases. It should be recognized that the cross-sectional dimension of each fluid path can vary with the fluid(s) and the application. For example, in some cases, it may be desirable to have a fluid path at least a portion of which has a height of greater than or equal to about 20 microns, greater than or equal to about 50 microns, or greater than or equal to about 100 microns.

The fluid paths can have any suitable cross-sectional shape that allows for fluid transport, for example, a square channel, a circular channel, a rounded channel, a parabolic channel, a rectangular channel (e.g., having any aspect ratio), a triangular channel, an irregular channel, etc. Of course, the number of channels, the shape or geometry of the channels, and the placement of channels within the system can be determined based on the specific application. As discussed below, a microfluidic channel system may be fabricated by methods known to those of ordinary skill in the art.

One aspect of the invention provides systems and methods of forming a microfluidic valve assembly, such as assembly 1-100, i.e., as shown in the embodiments illustrated in FIGS. 1F and 1G. In FIGS. 1F and 1G, a microfluidic valve assembly 1-100 can be formed in a structure 1-10 which may comprise any configuration or material as discussed above. For example, structure 1-10 may comprise PDMS and, as shown, may further comprise an additional layer of material 1-60. Layer 1-60 may be formed of the same or a different material than that of structure 1-10. Non-limiting examples of materials that can form layer 1-60 include polymers such as elastomers or other deformable materials, and rigid polymers such as polystyrene, polyurethane, and polycarbonate. Layer 1-60 may also be formed of non-polymers such as silicon and glass.

In one embodiment, an actuator 1-50 can be embedded in layer 1-60 and in a portion of structure 1-10, and positioned above a fluid path 1-30. For example, the actuator may be positioned in a hole 1-45 made by both layer 1-65 and structure 1-10 (FIG. 1E). As shown, the fluid path can be enclosed by another layer 1-20, which may be permanently or non-permanently attached to structure 1-10, and which can be formed of the same or a different material than that of layer 1-60 or structure 1-10. In some instances, a fluid path may be enclosed by a single layer of material. A method of forming assembly 1-100 is described in further detail below. FIG. 1G shows dimensions of assembly 1-100 according to one embodiment of the invention.

In one embodiment, the actuator may be a screw, such as a small machine screw, as shown in embodiment 2-50 of FIG. 2. However, it should be understood that the actuator may have other constructions such as a post, latch, membrane, valve (e.g., a push valve, binary valve, or electronic valve), or other structure that can control fluid flow. The type, composition, shape, and/or geometry of the actuator may influence how it is integrated into a structure. For instance, as shown in FIG. 2D, an actuator 2-50 that is a screw may form threads 2-55 in layer 2-60 of structure 2-10 and may fill a hole 2-45 in a portion of the structure. However, in other embodiments, an actuator of a different type, composition, shape, and/or geometry may be associated differently with the structure, e.g., the actuator may be fully or partially embedded in the structure, or integrally connected to the structure.

Figure 2A:
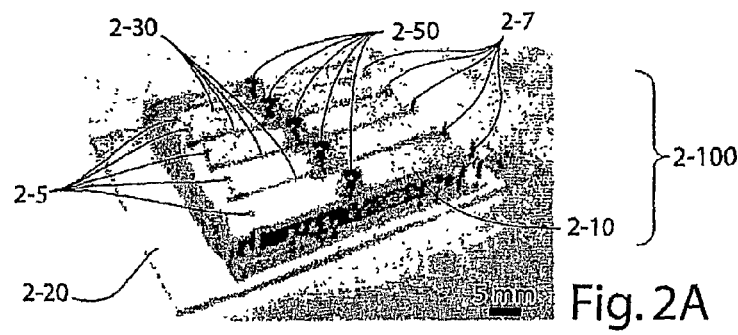
FIG. 2A illustrates, via a black and white photocopy of an optical photograph, a microfluidic device comprising a series of valves, according to one embodiment of the present invention.
Figure 2B:
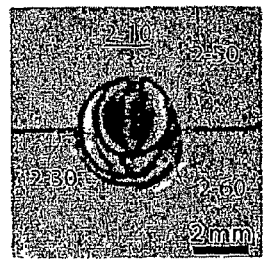
FIG. 2B illustrates, via a black and white photocopy of an optical photograph, a top view of a valve, according to one embodiment of the present invention.
Figure 2E:
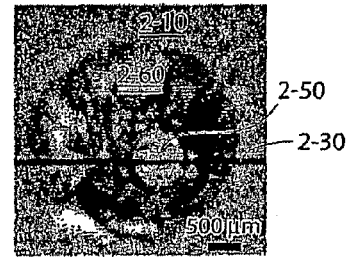
FIG. 2E illustrates, via a black and white photocopy of an optical photograph, a bottom view of a valve in an open position, according to one embodiment of the present invention.
Figure 2C:
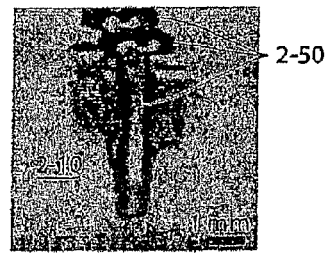
FIG. 2C illustrates, via a black and white photocopy of an optical photograph, a side view of a valve, according to one embodiment of the present invention.
Figure 2F:
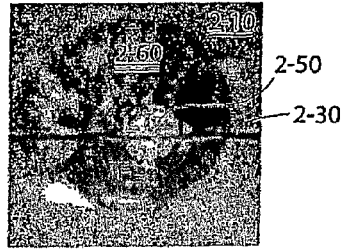
FIG. 2F illustrates, via a black and white photocopy of an optical photograph, a bottom view of a valve in a partially closed position, according to one embodiment of the present invention.
Figure 2D:
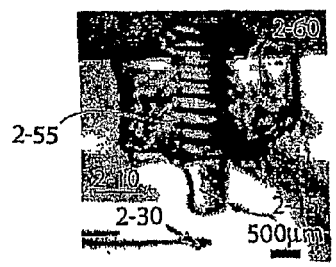
FIG. 2D illustrates, via a black and white photocopy of an optical photograph, a side view of a mold of a valve, according to one embodiment of the present invention.
Figure 2G:
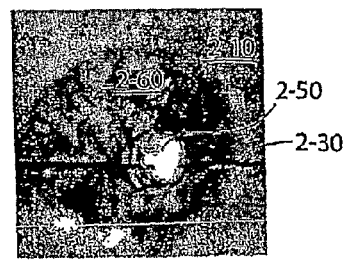
FIG. 2G illustrates, via a black and white photocopy of an optical photograph, a bottom view of a valve in a completely closed position, according to one embodiment of the present invention.

As illustrated in FIG. 2D, an actuator 2-50 may be positioned near a microfluidic fluid path, such as on top of and/or perpendicular to fluid path 2-30. In other cases, however, it may be desirable to position one or more actuators at the same or at different angles relative to one or more fluid path(s). For example, an actuator may be positioned at an angle greater or less than about 30 degrees, greater or less than about 60 degrees, greater or less than about 90 degrees, greater or less than about 120 degrees, or greater or less than about 150 degrees relative to one or more fluid path(s).

As shown in FIG. 2B, actuator 2-50 may have a diameter larger than the width of a fluid path 2-30. In some embodiments, an actuator may have a diameter of less than or equal to about 2 mm, less than or equal to about 1 mm, or less than or equal to about 0.5 mm. In another embodiment, an actuator may have a diameter of less than or equal to about 35 times the width of a fluid path, less than or equal to about 15 times the width of a fluid path, less than or equal to about 10 times the width of the a path, or less than or equal to about 5 times the width of a fluid path. Therefore, the dimensions of the actuator and/or fluid path can vary with the application.

In one embodiment, an actuator may move rotationally between a first position causing relatively greater constriction of a fluid path and a second position causing relatively lesser constriction of the fluid path. For example, if the actuator comprises a screw, such as the ones shown in FIG. 2, the actuator may be actuated by rotating the screw using a screwdriver or an equivalent apparatus. An actuator can be actuated by any suitable means which depends, in part, on the type, composition, shape, and/or geometry of the actuator. In another embodiment, an actuator may be actuated, for example, by pushing or pulling, or by being moved vertically, e.g., if it is a post, a latch, or another object, in order to constrict at least a portion of the fluid path. An actuator can be actuated manually or electrically. It may also be actuated to different degrees; for instance, an actuator may have an "on" state, e.g., whereby a fluid path is completely constricted by the actuator, an "off" state, e.g., whereby a fluid path is not constricted by the actuator, and multiple in-between states, whereby fluid is partially constricted by the actuator. For example, as shown in FIG. 2E, actuator 2-50 does not constrict any portion of fluid path 2-30. In FIG. 2F, actuator 2-50 partially constricts fluid path 2-30, and in FIG. 2G, actuator 2-50 completely constricts a portion of the fluid path 2-30.

Figure 3:
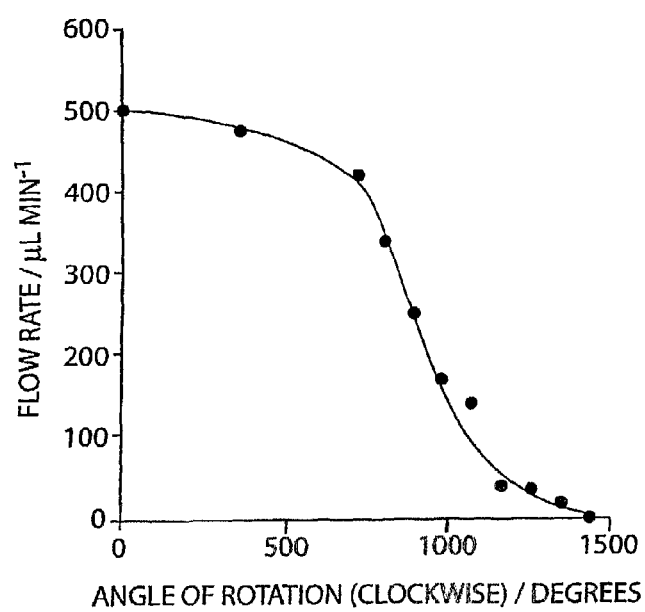
FIG. 3 illustrates graphically a relationship between the flow rate of a fluid in a fluid path and the angle of rotation of an actuator, according to one embodiment of the present invention.

When an actuator constricts a portion of the fluid path, the flow rate of the fluid flowing in the fluid path may be affected. For instance, FIG. 3 shows that when an actuator, such as the one illustrated in FIG. 2, is actuated to further constrict a fluid path, (e.g., by rotating it so that it is in a position causing relatively greater constriction of the fluid path), the flow rate of a fluid flowing in the fluid path decreases.

In some embodiments, an actuator may be near a microfluidic fluid path but may not be in fluid communication with any microfluidic fluid path. For instance, in FIG. 2D, an actuator (not shown) that is threaded into layer 2-60 can be positioned on top of fluid path 2-30 but may be separated from the fluid path by a portion of the structure 2-10. Therefore, actuator 2-50 is not in fluid communication with fluid path 2-30 or with any other fluid path(s). An actuator may be separated from a fluid path by any allowable distance that can constrict a portion of the fluid path. The separation distance may depend on the method of fabrication, the geometry and/or dimensions of the actuator and/or fluid path(s), and/or the particular application. In some cases, for example, it may be desirable to position an actuator close to the fluid path (e.g., within 300 microns) so, that a slight actuation of the actuator causes a relatively high constriction of the fluid path. In other cases, it may be desirable to position an actuator further away from a fluid path so that actuation of the actuator causes a relatively low constriction of the fluid path. This may be useful for controlling (e.g., fine-tuning) the flow rate, positioning, and/or width of a fluid in a fluid path, as discussed further below. For example, an actuator may be separated by greater than or equal to 150 microns, greater than or equal to 300 microns, or greater than or equal to 3 mm from the fluid path.

In another embodiment, an actuator may constrict a first and a second portion of a microfluidic fluid path, which may define a cross-sectional dimension of the fluid path. For example, if the fluid path is rectangular, the first portion may be positioned on a first wall of the fluid path and the second portion may be positioned on the opposite wall of the fluid path. If the fluid path is semi-circular, the first portion may be positioned on the first corner of the fluid path (where the roof meets the floor of the fluid path) and the second portion may be positioned on the second corner of the fluid path. In some embodiments, constriction of the fluid path may be caused by applying a physical contact force to the fluid path, which may deform at least the first and/or the second portion(s) of the fluid path.

In use, according to one embodiment, a method of restricting flow in a microfluidic fluid path may comprise moving an actuator from a first position defined relative to a microfluidic fluid path to a second position defined relative to the fluid path wherein the second position causes more restriction of flow through the fluid path than is caused by the first position. In some of these methods, the actuator may be maintained in the second position without applying energy to the actuator. The actuator may further be insensitive to variations to operable working environment of the actuator. For instance, the actuator may be maintained in the second (or first) position without requiring electricity or a pressure source, such as that from a gas tank or a syringe, or without subjecting the actuator to any particular conditions, such as a certain temperature, pH, light condition, or ambient pressure. In some embodiments, the actuator may be able to withstand high back-pressures without application of energy to the actuator. For instance, an actuator may withstand a back-pressure of greater or equal to about 40 kPa in some cases, greater or equal to about 90 kPa in other cases, and greater or equal to about 140 kPa in yet other cases.

Another aspect of the invention provides methods for controlling the flow of fluid in a microfluidic channel, such as controlling the width(s) of one or more fluid streams in a channel, controlling the flow rate(s) of one or more fluid streams in a channel, and focusing one or more fluid streams in a channel. In one embodiment, a method comprises establishing a flowing stream of a fluid in a channel, e.g., by applying a vacuum downstream of the channel, the stream including first and second components in contact with each other and defining therebetween a boundary, and changing a width of the first component by controlling a valve that is in fluid communication with the flowing stream. The first and second components may be, for example, laminar streams of fluid. In one embodiment, the first component may comprise a binding partner that can bind with a binding partner of the second component (see Examples, below). In another embodiment, the first component may comprise a binding partner that can bind with a binding partner that is disposed on a surface of the channel. Binding partners that are disposed on a surface of a channel may associate directly with the surface, e.g., by binding with a channel surface covalently, or through hydrogen bonding, van der Wads interactions, hydrophilic and/or hydrophobic interactions, magnetic interactions, or the like. A binding partner may also associate indirectly with a channel surface, e.g., via the surface of a cell that is attached to the surface of the channel, or a polymer layer that is associated with the surface of the channel.

Figure 4A:
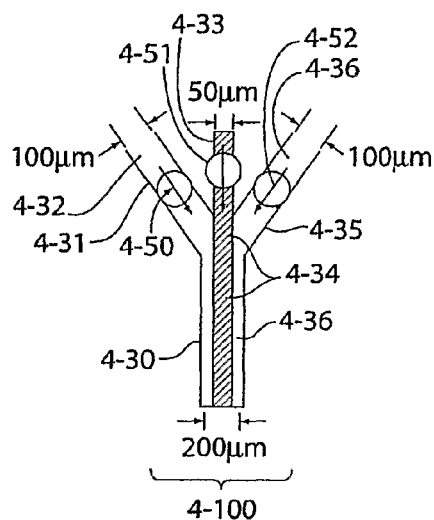
FIG. 4 illustrates schematically a device for focusing streams of fluid in a microfluidic channel, according to one embodiment of the present invention.
Figure 4B:
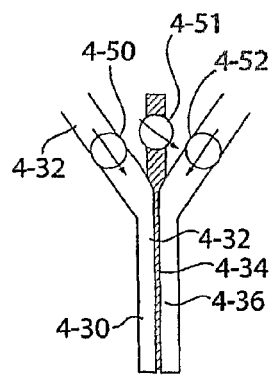
Figure 4C:
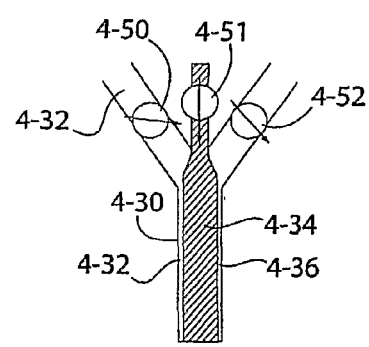

One example of controlling fluid flow is illustrated in FIG. 4, which shows a microfluidic device 4-100, comprising a series of channels 4-31, 4-33, and 4-35 converging into one main channel 4-30. Each of these channels may comprise one or a plurality of valves that can restrict fluid flow. For instance, channel 4-31 contains fluid 4-32 which is controlled by valve 4-50, channel 4-33 contains fluid 4-34 which is controlled by valve 4-51, and channel 4-35 contains fluid 4-36 which is controlled by valve 4-52. The widths of each of these fluids in main channel 4-30 can be controlled by opening or closing each of these valves. For example, in FIG. 4A, all valves are open, allowing all fluid streams to flow into main channel 4-30 without being restricted. In FIG. 4B, valve 4-51 is partially closed, which partially constricts channel 4-33, and only a portion of the fluid in channel 4-33 can flow into main channel 4-30; therefore, the width of stream 4-34 is narrowed, or focused, in channel 4-30 in FIG. 4B relative to FIG. 4A. Of course, fluid 4-34 can be narrowed, widened, or positioned in channel 4-30 to any degree by controlling valves 4-50, 4-51 and 4-52. For instance, in FIG. 4C, by completely opening valve 4-51 and partially closing valves 4-50 and 4-52, the width of stream 4-34 can be widened and the width of streams 4-32 and 4-36 can be narrowed. Device 4-100, as shown in FIG. 4, comprises three channels converging into one main channel. However, in other embodiments, four, five, or a plurality of channels may converge into a single or multiple main channel(s), where each channel may comprise one or more valves that can restrict fluid flow.

A fluid can be focused when surrounded by either miscible or immiscible streams. For example, in FIGS. 5A and 5B, all streams of fluid in channel 5-30 are miscible and flow in the direction of arrow 5-90. An aqueous solution of fluorescein 5-34 can be focused in channel 5-30 by partially closing the valve that controls fluid 5-34, and opening the valves that control aqueous solutions of water, 5-32 and 5-36. In this example, fluid stream 5-34 can be focused from a width of 48 microns (FIG. 5A) to a width of 2.5 microns (FIG. 5B). In FIG. 5C, a solution of fluorescein in poly(ethylene glycol) 5-44 can flow between immiscible solutions of silicone oil 5-42 and aqueous poly(vinylpyrrolidone) 5-46 in the direction of arrow 5-91. Partially closing the valve that controls fluid 5-44 while opening the valves that control fluids 5-42 and 5-46 causes the fluorescent stream to be focused, which can reduce the width of stream 5-44 from 37 microns wide (FIG. 5C) to 1.8 microns wide (FIG. 5D). The extent to which a stream is focused may be controlled, in part, by the degree to which the valves are open.

Another example of controlling fluid flow is shown in FIG. 6, where a flowing stream of a fluid 6-30 comprises a first component, e.g., 6-32, in contact with a second component, e.g., 6-33. Of course, a flowing stream of fluid may comprise a plurality of components in contact with each other, such as stream 6-30 comprising components 6-31, 6-32, 6-33, 6-34, 6-35, and 6-36. Flow of fluids 6-31, 6-32, 6-33, 6-34, 6-35, and 6-36 may be controlled by one or more valves positioned near the fluid paths containing each of the fluids. The valve(s) may optionally be one of the valves described earlier. In one embodiment, each valve may be controlled independently of each other. In another embodiment, the valves may be interconnected, e.g., electrically, and may have the same or different modes of operation. Interconnected valves may, for example, be connected in parallel and/or in series, and can be actuated simultaneously if desired. A valve may be used to constrict a portion of a fluid path, thereby controlling the flow rate of a fluid in the fluid path and/or the width of the fluid in a converging stream, such as the one shown in 6-30: For instance, in FIG. 6A, each of the valves controlling fluid streams 6-31 to 6-36 are open and the channels containing fluid streams 6-31 to 6-36 are not constricted. In FIG. 6B, the valve controlling stream 6-31 is closed completely, thereby completely constricting the channel containing fluid stream 6-31. This can prevent stream 6-31 from flowing into stream 6-30, and may influence the width(s) of one or more of the other streams in converging stream 6-30; for instance, component 6-33 in stream 6-30 is relatively wider in FIG. 6B than in FIG. 6A. In FIG. 6C, the valve controlling stream 6-32 is closed and all other valves are open, causing fluid 6-33 to be shifted along the width of stream 6-30 in FIG. 6C relative to FIG. 6A. This shows that the closing of a valve may influence the relative position of a fluid in a converging stream.

Another aspect of the invention provides systems and methods of storing and delivering fluids in a microfluidic system. In one embodiment, a method of storing a fluid in a microfluidic system may comprise urging the fluid into a reservoir via a first microfluidic fluid path and closing at least a first valve dispose between the reservoir and the fluid path. The fluid stored in the reservoir may comprise an analyte, i.e., to be analyzed in a chemical or biological reaction on the device, a buffer, or a pump fluid, i.e., a fluid used to generate a differential pressure within the device, as described in more detail below.

A reservoir may comprise any suitable shape, geometry, or dimension and may be comprised of any material as long as it can hold a fluid. For instance, in one embodiment, a reservoir May be a channel. In another embodiment, it may be an inlet, and in yet another embodiment, it may be a chamber comprising a parametric shape, e.g., the chamber may be square, rectangular, circular, triangular, or irregularly shaped. In certain embodiments, the reservoir has a shape that does not include sharp corners, such as a circular or oval-shaped reservoir, or a reservoir with rounded corners. Advantageously, such geometries can facilitate complete filling of the reservoir and/or release of a fluid from the reservoir.

In some instances, the reservoir may be comprised of the same material as that of the fluid path. However, in other instances and depending on the application, the reservoir may be comprised of a different material than that of the fluid path. A reservoir may optionally comprise additional components disposed therein, such as posts, sensors, and the like.

A fluid may be urged into a reservoir by a variety of methods. Non-limiting examples include using a syringe pump or a vacuum source, and filling the reservoir manually using a syringe or pipette. In one embodiment, at least a portion of the reservoir may expand upon urging a fluid into the reservoir. A reservoir can be expanded to varying degrees depending on, i.e., the desired use of the reservoir, how much fluid needs to be delivered in the microfluidic system, and/or the flow rate desired. For example, the reservoir may be expanded to greater than twice its original volume, greater than three times its original volume, greater than four times its original volume, greater than six times its original volume, greater than ten times its original volume, greater than fifty times its original volume, or greater than a hundred times its original volume. In one particular embodiment, a reservoir fabricated in PDMS and bonded to a glass slide was filled with fifty times its original volume without leaking. Other types of materials used to fabricate microfluidic assemblies may allow different filling capacities. The reservoir can have, therefore, different geometries and can be made in different materials, e.g., depending on the desired capacity of the reservoir. In cases where the reservoir expands, the reservoir can be formed of a material that can suitably expand (e.g., an elastomer). Those of ordinary skill in the art can select suitable materials based on, e.g., the elastic modulus, hardness, and/or compatibility of the materials (i.e., with certain structures in the device and/or with fluids to be used in the device), in combination with description described herein.

In one embodiment, urging a fluid into the reservoir may impart a potential energy to the reservoir and the fluid contained in the reservoir. If a valve, disposed between the reservoir and a fluid path, is closed, the potential energy may be stored in the reservoir. The build-up of potential energy may be caused by one or more sources. For instance, in one embodiment, urging a fluid in a reservoir may cause a difference in height of a fluid in the reservoir compared to the height of a fluid in the fluid path, which stores potential energy in the reservoir in the form of gravity. In another embodiment, urging a fluid into a reservoir via a fluid path may cause at least a portion of the reservoir to deform elastically. Closing a valve disposed between the valve and the fluid path may maintain the elastic portion in a deformed state (e.g., stretched or expanded); thus, potential energy may be stored in the reservoir in the form of elastic potential energy. Of course, a combination of forms of potential energy may be stored in the same and/or different reservoirs.

In another embodiment, a microfluidic fluid delivery system is described. A microfluidic fluid delivery system may comprise a reservoir defined by a first volume containing a first fluid at a first pressure, and a microfluidic fluid path in fluid communication with the reservoir. In these systems, the microfluidic fluid path may also contain a second fluid at a second pressure wherein the second pressure is less than the first pressure. A valve may be disposed between the reservoir and the fluid path, which, when moved from a first position to a second position, can allow at least a portion of the first fluid to flow from reservoir to the microfluidic fluid path. In some cases, this may cause the reservoir to have a second volume wherein the second volume is less than the first volume. In other cases, moving the valve from the first to the second position may cause the reservoir to have a lower pressure than the first pressure. Sometimes, both the pressure and the volume of the reservoir may decrease.

The first fluid (fluid in the reservoir) and the second fluid (fluid in the fluid path) may comprise the same or different chemical compositions. The first and second fluids may also be in the same or different fluid state. For example, in one embodiment, the first fluid may be in the liquid state and the second fluid may be in the gaseous state. In another embodiment, both the first and the second fluids may be in the liquid state. The first fluid may optionally comprise a component, e.g., a binding partner, that binds or reacts with a component of the second fluid, or, if desired, the first fluid may dilute a component of the second fluid. A microfluidic fluid delivery system can optionally comprise a valve that is similar to one or more of the valves described above.

Figure 7A:
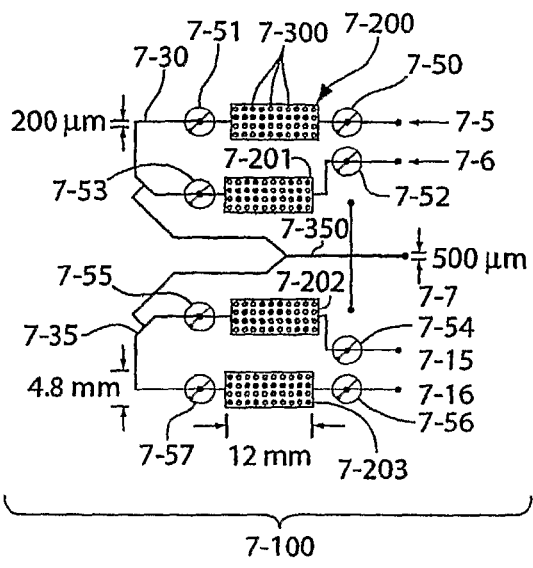
FIG. 7A illustrates schematically a device for moving fluids in microfluidic channels using reservoirs filled with reagents under pressure, according to one embodiment of the present invention.
Figure 7B:
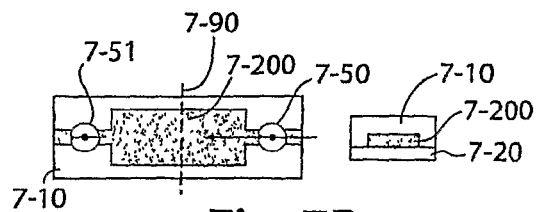
FIGS. 7B-E illustrate schematically the cross-sections of a reservoir when a fluid is filled, or is released from, the reservoir, according to one embodiment of the present invention.
Figure 7C:
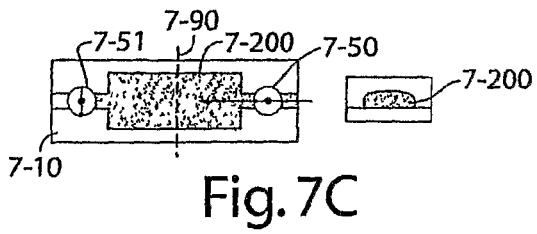
Figure 7D:
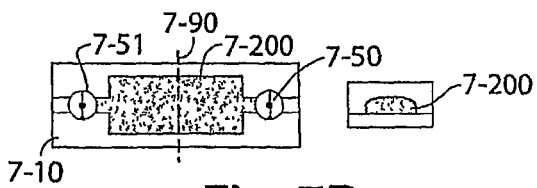
Figure 7E:
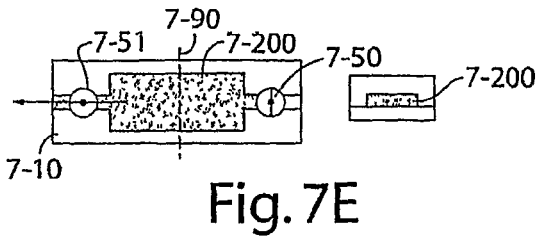

A microfluidic fluid delivery system may further comprise a plurality of valves disposed between the reservoir and a plurality of fluid paths. For example, the system may comprise a second valve disposed between the reservoir and a second fluid path, a third valve disposed between the reservoir and a third fluid path, a tenth valve disposed between the reservoir and a tenth fluid path, or a hundredth valve disposed between the reservoir and a hundredth fluid path. Thus, a single reservoir may deliver fluids to one or more fluid paths, and optionally to one or more reservoirs in fluid communication with a fluid path. For instance, in FIG. 7, device 7-100 comprises a plurality of reservoirs in fluid communication with several fluid paths. A fluid path 7-30 may be in fluid communication with reservoir 7-200, and valves 7-50 and 7-51 may control the flow of a fluid into reservoir 7-200 and fluid path 7-30. To store a fluid in reservoir 7-200, valve 7-51 may be completely closed, and a fluid may be introduced into inlet 7-5 while valve 7-50 is open. Before filling reservoir 7-200, the reservoir may comprise a cross-section such as the one shown in FIG. 7B (far right). Fluid flowing into the reservoir may cause at least a portion of the reservoir to expand, for example, as shown in the cross-section of reservoir 7-200 in FIG. 7C. After fluid fills the reservoir, valve 7-50 may be closed so that the fluid can be retained in reservoir 7-200 (FIG. 7D). To deliver fluid into fluid path 7-30, valve 7-51 may be opened and fluid may be forced out of reservoir 7-200, e.g., due to the difference in pressure between the fluid in fluid path 7-30 and the fluid in reservoir 7-200, or due to the collapse of structure 7-10 which contains reservoir 7-200. After fluid is forced out of the reservoir, the reservoir may comprise a cross-section such as the one shown in FIG. 7E.

Figure 8A:
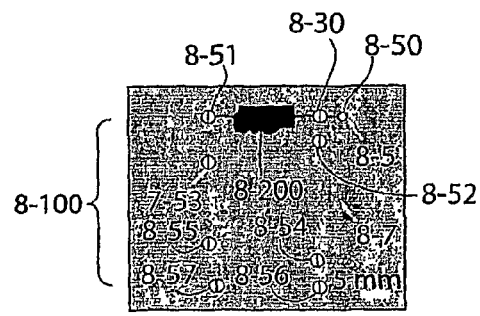
FIG. 8 illustrates, via black and white photocopies of optical photograph, the delivery of a reagent from reservoir to one or more fluid paths as a function of time, according to one embodiment of the present invention.
Figure 8D:
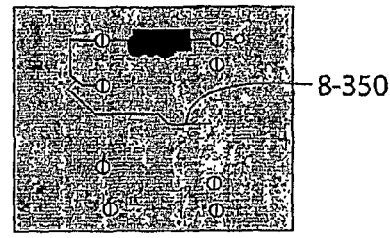
Figure 8B:
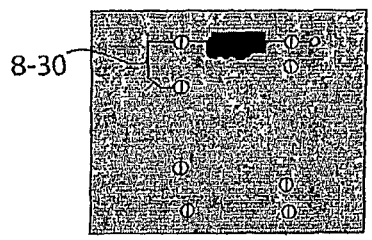
Figure 8E:
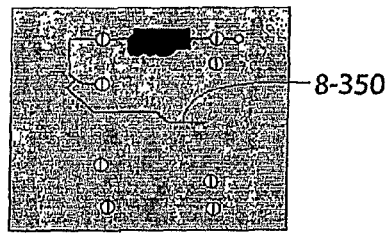
Figure 8C:
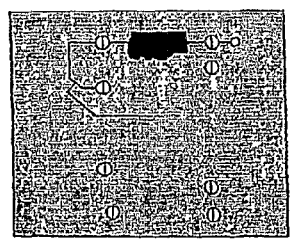
Figure 8F:
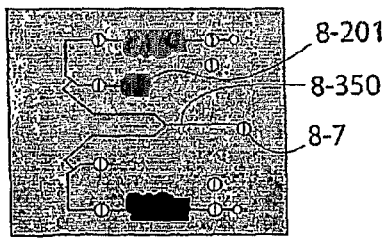

In some cases, it may be desirable to deliver fluids to one or more fluid paths, and optionally to one or more reservoirs in fluid communication with a fluid path. Furthermore, it may be possible to control the timing of the delivery of a fluid by varying the flow rate of the fluid in each fluid path, e.g., by varying how much a valve constricts the fluid path. For instance, FIG. 8A shows the storage of a fluid in reservoir 8-200; valves 8-50 and 8-51 prevent the fluid in the reservoir from flowing into other fluid paths. Valves 8-51 and/or 8-51 can be opened at any point in time so that the fluid can flow from the reservoir to a fluid path. For instance, after 2 seconds of opening valve 8-51, fluid flows into fluid path 8-30 (FIG. 8B), and then to additional fluid paths as shown in FIGS. 8C, 8D, and 8E. After 10 seconds, valve 8-53 may be opened; a portion of reservoir 8-201 can be filled, and a portion of the fluid can reach outlet 8-7 (FIG. 8F). Therefore, valve 8-51 may be opened partially or completely, depending, for example, on the flow rate desired in a fluid path, the rate of filling a reservoir, and/or the rate of expelling a fluid.

Methods and apparatuses of the invention can be used in a variety of settings, including essentially any arrangement in which it is useful to move fluids within fluid pathways, e.g. on a chip or other small-scale reactor. For example, lab-on-a-chip technology is known, and the present invention can be used in essentially any such arrangement. One setting is the use of the devices described herein to perform immunoassays, as described in more detail in Example 7 and FIG. 9. Advantageously, such devices can allow the end user to select one of several different assays or reactions by choosing from a combination of reagents that are preloaded and stored in reservoirs of the device.

In another embodiment, storing and pumping of reagents through microfluidic channels can be performed using an actuator, e.g., a valve, to create microfluidic pressure operated pumps (μPOPs). The μPOPs can contain fluids (e.g., pump fluids, described below) that are stored under pressure in microfluidic reservoirs. The pressurized pump fluids can be used to cause other fluids (e.g., reagents) to flow in the microfluidic device. In some instances, μPOPs can be integrated into portable microfluidic devices for storing fluids on-chip, pumping fluids, and controlling the rate of flow of fluids. The successful integration of certain components can eliminate the need for bulky, external instrumentation—syringe pumps, power sources, or vacuum sources—and may make it possible to develop portable analytical and diagnostic tools for settings where access to equipment is limited.

To create a pressure operated pump, actuators can be integrated into microfluidic channels that are connected to μPOPs, where fluids can be stored. The μPOPs have an initial volume $v_C$, and can be filled with fluids using a syringe pump; the volume of the liquid, $v_L$, delivered to the μPOP reservoir can be determined by metering out fluid using a syringe pump. When the μPOP reservoirs are "overfilled"—that is, $v_L \gg v_C$—the pressure of the liquid causes the volume of the reservoir to expand. The pressure can be stored in the elastic deformation of the material used to form the walls, ceiling, and/or floor of a μPOP by blocking the inlet and outlet channels using actuators or valves. When the valve on a channel connected to a μPOP is opened, the elastic stress stored in the walls, ceiling, and/or floor of the reservoir can push the fluid out through an outlet channel.

FIG. 10 is a diagram illustrating how fluid can be stored and released in a μPOP. FIGS. 10A-10P show a single μPOP reservoir 10-70 with inlet channel 10-30, outlet channel 10-32, and actuators 10-50 and 10-51. Any suitable actuators can be used. In some cases, the actuators can comprise small machines screws, e.g., with dimensions 1.4 mm wide, 7 mm tall, and 300 μm pitch. The microfluidic network can be fabricated in PDMS and bonded to a glass slide that forms the floor of the channel. The channels may have dimensions of about 200 μm wide, the reservoirs may be 2 mm wide ($v_C \approx 90$ nL), and the features may be about 28 μm tall. It is to be understood that the dimensions, configurations, and materials used to form these components are exemplary, and that other dimensions, configurations and/or material compositions of channels, reservoirs, actuators, and components can be used in the embodiments described herein.

FIGS. 10A-10D show a μPOP reservoir before being filled with fluid. FIG. 10A is a schematic diagram of a microfluidic system including a single μPOP reservoir. FIG. 10B is a schematic diagram depicting the cross section of the reservoir shown in FIG. 10A. FIG. 10C shows an image of a microfluidic system including the single μPOP reservoir. FIG. 10D is a schematic diagram depicting the cross section of the reservoir shown in FIG. 10C. In FIGS. 10A-10D, valves 10-50 and 10-51 on the inlet and outlet channels, respectively, are open and fluid can be pumped into the inlet channel. Dashed arrow 10-54 shows the direction of flow of fluid in the reservoir. Dashed line 10-56 shows the position where the cross-section is drawn; the cross section of the reservoir is rectangular.

FIGS. 10E-10H show how fluid can be filled in the μPOP reservoir. The reservoir can be filled with one volume of liquid ($v_L = v_C$); valve 10-51 on the outlet channel can then be closed while the valve on the inlet channel remains open.

FIGS. 10I-10L show how fluid can be stored in the μPOP reservoir. As more fluid is pumped into the reservoir, $v_L > v_C$ and valve 10-50 on the inlet channel can be closed. The fluid in the reservoir can be stored under pressure ($v_L > v_C$). FIGS. 10J and 10L are cross sections showing the deformation of the walls and ceiling of the reservoir into a hemi-spherical shape. In this particular embodiment, $v_L \approx 10$ μL.

FIGS. 10M-10P show how fluid can be released from the μPOP reservoir. Valve 10-51 on the outlet channel can opened and the pressure stored in the μCOP may pushes fluid through the outlet channel. In some cases, approximately one volume of liquid can remain in the reservoir after the reservoir is allowed to relax for 10 min ($v_L \approx v_i$). FIG. 10O was taken 2 seconds after opening the valve on the outlet channel. Dashed line 10-54 shows the direction of flow.

In some embodiments, fluids can be stored under pressure in μPOPs for prolonged periods of time (e.g., greater than 1 day, greater than 7 days, greater than 15 days, greater than 30 days, greater than 40 days, greater than 2 months, or greater than 1 year). Storing a fluid under pressure may fulfill a variety of purposes. For instance, storing a fluid may preserve one or more reactants in the device, i.e., storage may prevent a reactant, reagent, or component from denaturating or decomposing. In some cases, storage can minimize and/or prevent evaporation of a fluid from the device. Additionally or alternatively, storage may maintain the potential energy stored in the device. Various methods of storing fluids under pressure can be used and may depend on the particular fluids to be stored, the materials used to fabricate the device, the pressure under which the fluids are to be stored, the desired length of time of storage, etc.

In one embodiment, a fluid under pressure in a device can be stored at a temperature that causes the fluid to become more viscous than at a temperature at which the device is designed to operate. I.e., for a device containing an aqueous solution, storing the device at a temperature of less than or equal to 0° C. (or another freezing point if altered by a component of the solution) can cause the solution to freeze. Freezing the device can prevent denaturation and/or decomposition of the reagents in the solution and may minimize evaporation of the stored fluid. In some cases, a fluid under pressure in a device can be stored at a temperature that causes the fluid to have a lower vapor pressure than at a temperature at which the device is designed to operate. I.e., although a temperature of 0° C. may not cause freezing of certain organic solvents stored in a device, the temperature may cause those solvents to become more viscous and/or have a lower vapor pressure than at, e.g., an operating temperature of 25° C., and, therefore, may aid in storing the solvent for prolonged periods of time. For devices containing certain solvents, an appropriate storage temperature may depend on, i.e., the melting point, boiling point, and/or the vapor pressure of the solvent in combination with other factors described herein. This arrangement can provide the ability to load a particular device with one or more reagents and one or more pump fluids (if different from reagent fluids) under pressure in an expanded reservoir(s). The device can be stored at a temperature at which some or all fluids are frozen. In one arrangement, at least one pump fluid is frozen (other fluids can be frozen as well), which can lengthen the time over which the pump fluid in combination with its reservoir can store potential energy for later manipulation of fluids in the device. As one example of use of such a technique, a device can be loaded with reagents for performing a clinical diagnostic assay, and with a pump fluid, in an expanded reservoir, for manipulation of reagents in microfluidic channels to perform the assay upon appropriate manipulation of valves controlling fluidic connection between pump reservoir, reagents, and, e.g., an assay reaction site. The device can be prepared for use, and frozen for a period of time until needed. For example, the device can be loaded and frozen, and transported while frozen to a clinic where it is thawed when needed, and then used. Or the device can be loaded, transported to a use location, and then frozen for storage until needed.

In another embodiment, a fluid under pressure in a device can be stored for prolonged periods of time in an environment containing a gas of the solvent. For example, a reservoir can be filled with an aqueous solution and stored under pressure in a humid (e.g., water-saturated) environment. The humid environment can prevent evaporation of fluids (e.g., aqueous fluids) from the reservoir. In cases in which organic solvents are stored in devices, the device can be stored for prolonged periods of time in an environment containing a gas of the solvent. Other methods of storing a device are also possible.

In some cases, storage of a fluid under pressure in a reservoir of a device can be performed for prolonged periods of time, optionally with some or all fluids frozen, with less than 0.1% change in volume, less than 1% change in volume, less than 5% change in volume, or less than 10% change in volume of the reservoir and/or of the fluid to be stored.

Appropriate methods of storage can take into account the material used to fabricate the reservoir of the device. For example, for devices that store fluids using potential energy of the reservoir, an appropriate material (e.g., an appropriate elastomeric polymer) used to form the reservoir may chosen based on, i.e., the ability of the material to maintain its elasticity at the storage temperature (i.e., the polymer may have a low hysteresis at the storage temperature). In another embodiment, a OOP can be used to pump fluids (e.g., reagents) from several reservoirs in a microfluidic system or from any of a variety of locations in such a system to any of a variety of different locations. The μPOP may contain a fluid (e.g., a pump fluid which might not have any use in an actual assay interaction, reaction, or other chemical or biological interaction for which the device is designed) and can be placed under pressure, i.e., by urging the pump fluid into the μPOP reservoir as described above. In some cases, the μPOP can be connected to several reservoirs containing reagents, and flow between the μPOP and each reservoir can be controlled by one or more actuators (e.g., a valve) positioned between the μPOP reservoir and reagent reservoir. The μPOP can serve as a pump, fluidly connected or connectable to one or more reagents, to push the reagents through their respective channels, where the pump fluid need not participate in the intended reaction (indeed, the pump fluid can be inert with respect to the intended interaction). This system can be an alternative to storing many different fluids, e.g. reagents, under pressure, for individual delivery where and when needed via potential energy stored in the expansion of a reservoir containing a fluid. In some embodiments, combinations of reservoirs (e.g., reagent reservoirs and μPOP reservoirs) can be placed under pressure for delivery of fluids.

A pump fluid may be a fluid that is used to pressurize a reservoir, but is not involved with a reaction or analysis of components in the device. In some cases, the pump fluid may be a fluid in a different phase than that of the reagents (e.g., immiscible with the reagent fluid or fluids). For example, if the reagents are aqueous, the pump fluid may comprise a fluid immiscible with the aqueous phase (e.g., an organic solvent). In another embodiment, the pump fluid may be of the same phase as that of the reagents. E.g., for cases in which the reagents are aqueous and dilution of the aqueous reagents is not an issue, the pump fluid may also be aqueous.

Suitable fluids that can be used as the pump fluid include fluids that are compatible with the materials used to form the device. Physical properties of the fluid such as boiling point, melting point, and vapor pressure may also determine whether or not a fluid is suitable. E.g., for devices made in PDMS, suitable pump fluids may include methylperfluoromethyldecalin, PFD, silicone oil, nitromethane, and water. In some cases, fluids that do not cause swelling of the polymer are preferred. An appropriate pump fluid may also take into account the storage capabilities of the fluid, i.e., to minimize evaporation of the fluid over prolonged periods of time, fluids having a low boiling point may be suitable. In some cases, a pump fluid may comprise a gas such as air, $N_2$, Ar, $O_2$, and $CO_2$.

FIG. 12 shows a microfluidic system including a μPOP that can be used to pump fluids from several reservoirs in the system. In the embodiment illustrated in FIG. 12, μPOP reservoir 12-70 is fluidly connected to reservoir 12-72A via channel 12-30A. Valve 12-50A is positioned between the μPOP reservoir and reservoir 12-72A, which may contain a fluid to be analyzed on the device (e.g., a reagent). The μPOP reservoir can also be connected to reservoirs 12-72B-D via channels 12-30B-D, respectively. Valves 12-50A-D may control fluid flow between the each of the respective reservoirs and channels.

Advantageously, each of fluids in reservoirs 12-72B-D can be controlled (i.e., delivered to another portion of the device) independently via the valves in combination with the pressurized fluid in μPOP reservoir 12-70. As a result, different reagents (i.e., contained in reservoirs 12-72B-D) may be delivered to another portion of the device at different points in time if desired. This may be particularly suitable, for instance, for performing multi-step reactions on-chip where different reagents are required at the reaction site during different steps of the reaction.

Figure 12A:
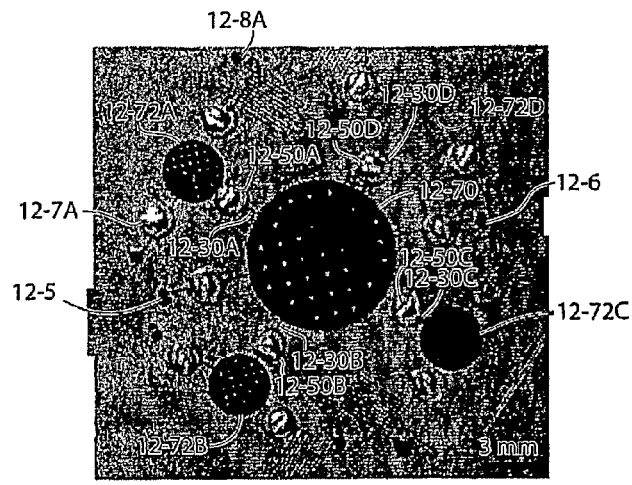
FIG. 12 shows the pumping of a fluid out of a reservoir connected to a microfluidic pressure operated pump according to one embodiment of the invention.
Figure 12B:
Figure 12E:
Figure 12C:
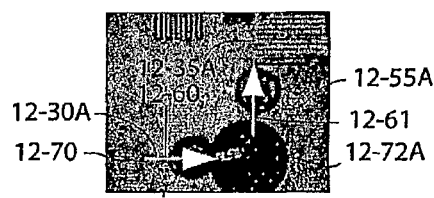
Figure 12F:
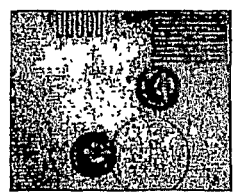
Figure 12D:
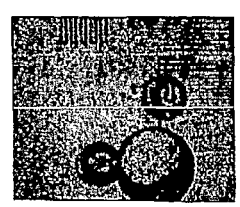
Figure 12G:
Figure 13A:
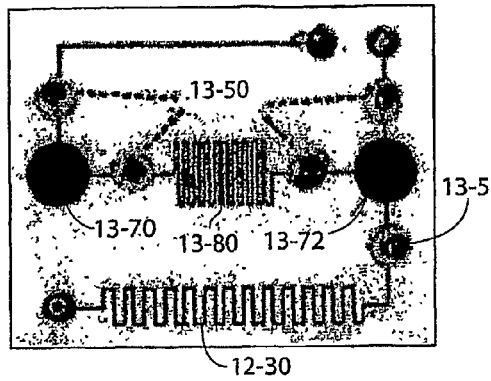
FIG. 13 shows the pumping of a fluid out of a reservoir connected to a microfluidic pressure operated pump using a gaseous pump fluid according to one embodiment of the invention.
Figure 13D:
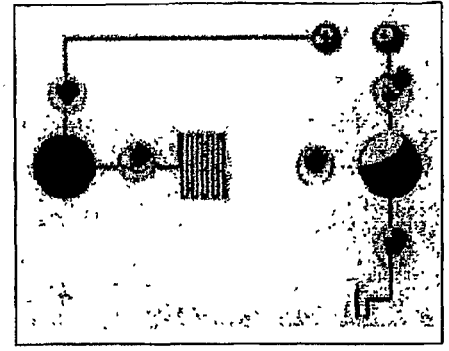
Figure 13B:
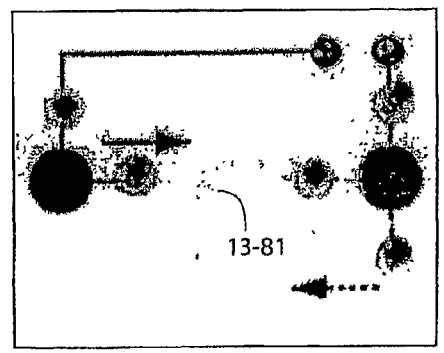
Figure 13E:
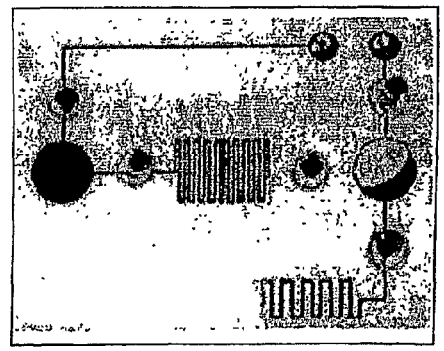
Figure 13C:
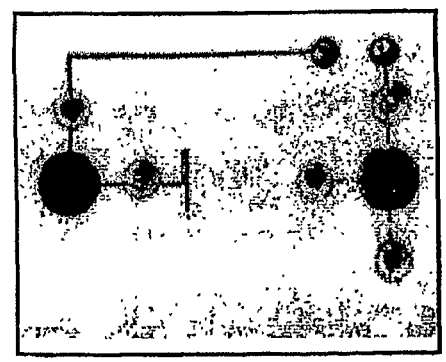
Figure 13F:
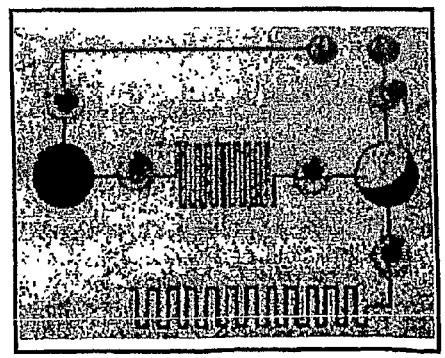

FIGS. 12B-12G shows the delivery of a reagent (shown here as a dark colored fluid) from a reagent reservoir to another portion of the device using a μPOP reservoir. In the embodiment illustrated in FIG. 12B, μPOP reservoir 12-70 contains a pump fluid (e.g., perfluorodecalin or a derivative thereof, shown here as a clear fluid) immiscible with the reagent solution in reagent reservoir 12-72A. In FIG. 12C, valve 12-50 between the μPOP reservoir and the reagent reservoir was opened. Valve 12-55A between the reagent reservoir and delivery channel 12-35 was also opened. This allowed the pump fluid to flow in the direction of arrow 12-60 into the reagent reservoir. Consequently, the pump fluid can displace the reagent from the reagent reservoir, and can cause the reagent to flow in the direction of arrow 12-61 to the delivery channel. FIG. 12C shows the flow of fluids 3 seconds after valves 12-50A and 12-55A were opened. FIGS. 12D-12G show the flow of fluids 5, 7, 9, and 11 seconds, respectively, after the valves were opened.

FIG. 13 shows the delivery of a reagent from a reagent reservoir to another portion of the device using a reservoir containing a gaseous pump fluid (e.g., air). FIG. 13A shows an image of the entire microfluidic system filled with dye. As illustrated in this embodiment, the device includes five valves 13-50 (e.g., 1 mm diameter screws, 5 mm long), μPOP reservoir 13-70 (e.g., volume 0.4 μL) and reagent reservoir 12-72 (e.g., volume 0.4 μL). FIG. 13B shows μPOP filled with 5 μL of dye and stored using the valves on the channels connected to the chamber. The reagent reservoir has been filled with ~0.4 μL of dye. Channel 13-80 in between the two compartments is left unfilled with dye but was filled with an air plug. FIG. 13C shows opening of the valve on the outlet channel of the μPOP and FIGS. 13D-13F were taken at 3 second intervals. The fluid from the μPOPs reservoir was pushed out by the plug of air into the serpentine outlet channel.

One procedure for fabricating a microfluidic channel in a structure is described below. It should be understood that this is by way of example only, and those of ordinary skill in the art will know of additional techniques suitable for forming microfluidic structures, for instance, as discussed in U.S. Pat. Nos. 6,719,868, 6,686,184, and 6,645,432, each of which is incorporated herein by reference.

In one embodiment, a microfluidic channel may be made by applying a standard molding article against an appropriate master. For example, microchannels can be made in PDMS by casting PDMS prepolymer (Sylgard 184, Dow Corning) onto a patterned photoresist surface relief (a master) generated by photolithography. The pattern of photoresist may comprise the channels having the desired dimensions. After curing for ~3 hours at 65° C., the polymer can be removed from the master to give a free-standing PDMS mold with microchannels embossed on its surface.

Inlets and/or outlets can be cut out through the thickness of the PDMS slab. To form substantially enclosed microchannels, the microfluidic channels may be sealed in the following way. First, the PDMS mold and a flat slab of PDMS (or any other suitable material) can be placed in a plasma oxidation chamber and oxidized for 1 minute. The PDMS structure can then be placed on the PDMS slab with the surface relief in contact with the slab. The irreversible seal is a result of the formation of bridging siloxane bonds (Si—O—Si) between the two substrates that result from a condensation reaction between silanol (SiOH) groups that are present at both surfaces after plasma oxidation.

The following examples are intended to illustrate certain embodiments of the present invention, but do not exemplify the full scope of the invention.

Example 1

Fabrication of Devices

The following example demonstrates a method for fabricating a microfluidic valve assembly. A brief description of this method is as follows (FIG. 1). Silicon wafers including designs of the microfluidic channels were fabricated in photoresist in bas-relief (SU8-100 or Shipley 5740) using conventional photolithography. Channels were typically 100 microns wide and the height varied between 15-100 microns. Channels with parabolic cross-sections (15 microns tall and 100 microns wide) were fabricated out of photoresist (Shipley 5740) on silicon wafers, and the resist was reflowed using a previously reported procedure. Wafers including features in bas-relief were silanized with a vapor of (tridecafluoro-1,1,2,2-tetrahydrooctyl)-1-trichlorosilane for 3 hr. PDMS prepolymer (300 microns-4 mm thick) was cast on silicon masters and cured thermally (65° C.). The PDMS layer comprising the microfluidic channels was peeled away from the silicon wafer, and inlet and outlet holes were drilled using a modified syringe needle. The channels 1-30 in the PDMS structure 1-10 were plasma oxidized and sealed irreversibly to a glass slide 1-20 (FIG. 1A).

Holes 1-40 (4 mm in diameter) aligned over channels 1-30 were drilled into the PDMS with a cork borer, to a depth of about 2-3 mm. The plugs of PDMS were removed with the cork borer; the holes served as a reservoir for a polyurethane layer. A second, smaller hole 1-45 was drilled with a 16.5 Ga needle directly above the channel, and within the reservoir for the polyurethane, to hold a screw in place while the polyurethane cured; the depth of the second hole was about 1-2 mm. Twisting the needle as it was pulled out of the PDMS typically dislodged the plug of PDMS; the plug could also be removed with a pair of tweezers. The diameter of the hole was the same as that of the screws that were used as valves, typically ≥1000 microns. The microfluidic device was treated with an oxygen plasma for 60 sec to render the PDMS hydrophilic. The screws 1-50 were pushed into the smaller of the two holes 1-45 until they made contact with the underlying layer of PDMS (FIG. 1C). The larger hole 1-40 was then filled with urethane (NOA 81) 1-60 (FIG. 1D); the underlying layer of PDMS can prevent the low viscosity urethane (300 cP at 25° C.) from flowing onto the device before it was cured. The polyurethane can be cured by exposing it to a UV lamp (wavelength, 365 nm), and incubating the device at 60° C. for 6 hr can improve the adhesion between the polyurethane and PDMS.

Example 2

Measurement of Flow Rate vs. Angle of Rotation

The following experiment shows a relationship between the flow rate of a fluid in a channel that comprised a valve, and the rotation of the valve as it constricted the channel. The device used in this experiment comprised a series of parallel microfluidic channels (100 microns wide, 100 microns tall) that were fabricated in PDMS and bonded to a glass slide. A microfluidic valve assembly was fabricated by positioning a valve (1 mm diameter) above each channel; the bottom of the valve and the top of the channel were separated by a layer of PDMS that was about 1 mm thick. To flow a fluid (food coloring) in the channel, a vacuum (35 torr) was applied to an outlet of a channel, and an inlet to the channel was immersed in food coloring. The vacuum was adjusted so that the flow rate was initially ~500 microliters per minute. The volume of fluid that was expelled from the outlet was measured over the course of five minutes. The valve was then rotated to varies degrees through 1400° (as viewed from above) to constrict the channel and restrict the flow of fluid in the channel; the volume was measured for 5 min after each rotation. Results of the experiment are shown in FIG. 3.

Example 3

Laminar Flow Experiments

Figure 6A:
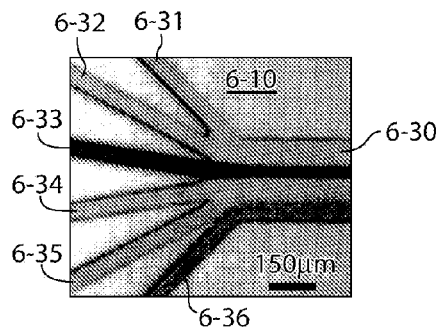
FIGS. 6A-G illustrate, via black and white photocopies of optical micrographs, the change in widths of fluid paths when valves in fluid communication with the fluid paths are in open and/or closed positions, according to one embodiment of the present invention.
Figure 6E:
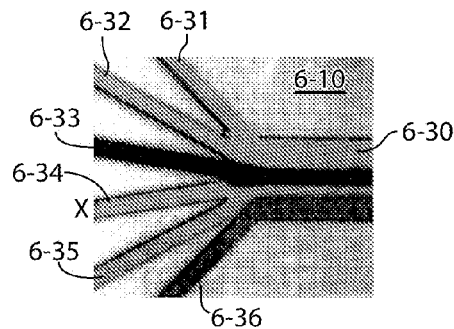
Figure 6B:
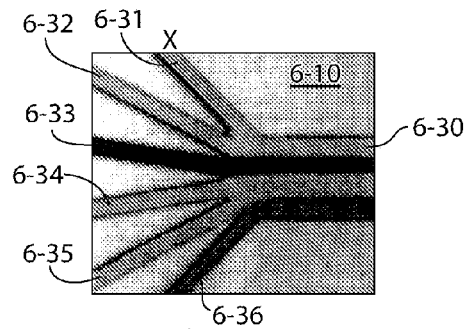
Figure 6F:
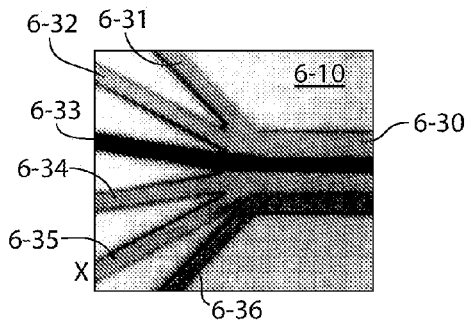
Figure 6C:
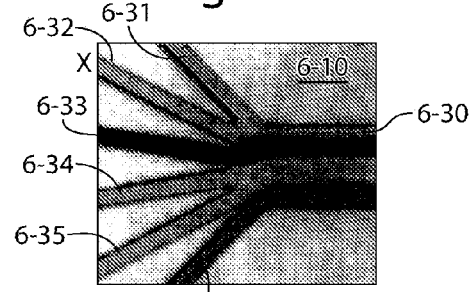
Figure 6G:
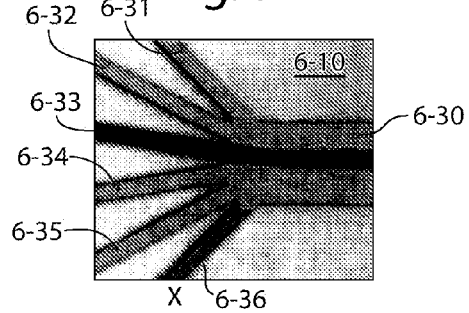
Figure 6D:
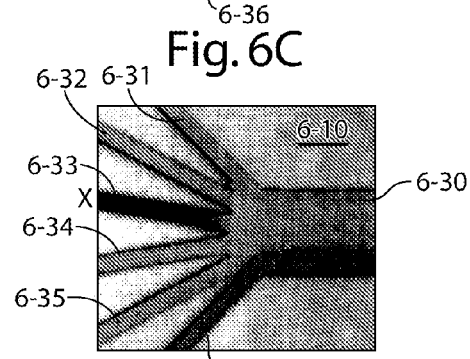

The following example demonstrates the control of laminar flow in a microfluidic device comprising a microfluidic valve assembly. The device used in this experiment is shown in FIG. 6; the device comprised six microfluidic channels 6-30, 6-31, 6-32, 6-33, 6-34, 6-35, and 6-36 (each of which were 100 microns wide, and 15-100 microns tall) that converged to a single channel 6-30 (600 microns wide, and 15-100 microns tall). Channels that were 15 microns tall had a parabolic cross-section; channels 100 microns tall had a square cross-section. The fluid in each channel 6-30-6-36 was controlled by a valve: for 15 microns tall channels, 500 micron diameter screws (4.7 mm long, 150 microns pitch) were used as actuators, and for 100 microns tall channels, 3 mm diameter screws (15 mm long, 750 microns pitch) were used as actuators. Solutions of different colored dyes were delivered to the six inlets of channels 6-30-6-36 using a syringe pump (flow rate 1-2 mL/hr for 15 microns tall channels, 3-10 mL/hr for 100 microns tall channels) or by connecting the outlet of the single channel 6-30 to a vacuum (35 torr). The flow rate of fluid in each channel was controlled with the valves. In FIG. 6A, all of the valves were open and the fluid in each of the channels was not restricted. In FIG. 6B, valve in channel 6-31 was closed, which restricted the fluid flow in that channel, and all other valves were open. In FIG. 6C, valve in channel 6-32 was closed and all other valves were open. In FIG. 6D, valve in channel 6-33 was closed and all other valves were open. In FIG. 6E, valve in channel 6-34 was closed and all other valves were open. In FIG. 6F, valve in channel 6-35 was closed and all other valves were open. In FIG. 6G, valve in channel 6-36 was closed and all other valves were open. The opening and/or closing of valves changed the width(s) of the converging streams in channel 6-30.

Example 4

Focusing Streams of Miscible Liquids

The following example demonstrates that the widths of streams of miscible fluids in a microfluidic channel can be controlled using a microfluidic valve assembly. A device similar to the one shown in the schematic diagram of FIG. 4 was used in these experiments. Photographs of the experiment showing segments of channel 4-30 are shown in FIG. 5. A vacuum was connected to the outlet (35 torr) of main channel 4-30 to pull water through the outer channels 4-31 and 4-35, and to pull an aqueous solution of fluorescein through the middle channel 4-33. The stream of fluorescein 5-34 in the flow channel was imaged using epifluorescence microscopy. Arrow 5-90 indicates the direction of flow of the three solutions. FIG. 5A shows that when all three valves were open (i.e., none of the fluids in these channels were constricted), stream 5-34 had a width of 48 µm. The rate of flow of the fluorescein stream was decreased by partially closing the valve connected to that stream, which produced a stream 2.5 microns wide (FIG. 5B).

Widths of streams of immiscible fluids in a microfluidic channel can also be controlled using a microfluidic valve assembly. Using the same device as shown in FIG. 4, a solution of fluorescein in poly(ethylene glycol) ($M_w$ 400) 5-34 was pulled through the middle channel, silicone oil 5-32 through one of the outer channels, and an aqueous solution of poly(vinylpyrrolidone) (1% w/w, $M_w$ 10,000) 5-36 through the other channel. When all three valves were open, the inner stream was 37 microns wide (FIG. 5C). The rate of flow of the middle stream was decreased by closing the valve connected to stream 5-34, which produced a stream 5-34 that was 1.8 microns wide (FIG. 5D).

Example 5

Reservoirs

The following example demonstrates a method for fabricating microfluidic reservoirs, and experiments carried out using the reservoirs. Microfluidic devices comprising the reservoirs were fabricated in PDMS using soft lithography; the channels were bonded to glass slides. The device (shown schematically in FIG. 7) comprised four rectangular reservoirs 7-200, 7-201, 7-202, and 7-203 (dimensions, 55 microns tall, 12 mm long, 4.8 mm wide) reinforced with circular posts 7-300 (40 high, 400 microns wide); the total volume of each reservoir was 3.09 microliters. Inlet channels 7-5, 7-7, 7-15, and 7-16 (200 microns wide) were connected to each reservoir. Pairs of outlet channels were connected by T-junctions that converged in a central channel 7-350 (500 microns wide, 16 mm long). Holes for inlets and a hole for an outlet at the end of the central channel were punched with a 16.5 Ga needle. Polyethylene tubing (PE 60, I.D. 0.76 mm, O.D. 1.22 mm, Becton Dickinson) was inserted into the holes for the inlets. Stainless steel machine screws (1 mm diameter, 5 mm tall, 0.3 mm pitch) were used as actuators and were fabricated above each inlet and outlet channel.

A photograph of the actual device is shown in FIG. 8. Valve 8-51 connected to the outlet of reservoir 8-200 and was closed using a screwdriver. The reservoir was filled with approximately one volume (3 microliters) of red food coloring using a syringe pump connected to the inlet 8-5 (Harvard Apparatus, flow rate 5 mL/hr). Valves on the outlet channels of all of the other reservoirs were then closed. Another two to three volumes of red food coloring was added to the reservoir 8-200 bringing the total volume in the reservoir to 9-12 microliters. As dye was added, the height of the reservoir increased and the walls were pushed outward. Valve 8-50 was then closed and the tubing was disconnected from the inlet. After 10 mins, no leaks of the reservoir were detected (FIG. 8A). Valve 8-51 was partially opened, allowing fluid to flow from reservoir 8-200 to channel 8-30 (FIG. 8B). Photographs were taken 2, 4, 6, and 8 seconds after valve 8-51 was opened (FIGS. 8B-E). FIG. 8F is a photograph acquired after valves on all of the outlet channels were opened. This experiment demonstrates that a fluidic reservoirs can be fabricated, filled, and used to transport fluids in a microfluidic device.

Example 6

Fabrication of Immunoassay Devices

The following example demonstrates a method for fabricating microfluidic immunoassay devices. A brief description of this method is as follows. Devices similar to the one shown in FIG. 9 were designed to comprise 8 reagent reservoirs 9-200, 9-201, 9-202, 9-203, 9-204, 9-209, 9-206, 9-207 (volume of each, 0.65 microliters) and two buffer reservoirs 9-208 (volume, 0.65 microliters) and 9-209 (volume, 0.44 microliters) that connect to a central channel 9-30 (500 µm diameter), in addition to an inlet port 9-5 and outlet ports 9-7 and 9-8. The reservoirs were connected to the central channel by channels that were 200 microns in diameter. The microfluidic channels and reservoirs (15 microns tall) were fabricated in photoresist (Shipley 5740) in bas-relief on silicon wafers using photolithography. The resist was reflowed for 30 min at 200° C. to obtain channels with parabolic cross-sections. Wafers were silanized with a vapor of (tridecafluoro-1,1,2,2-tetrahydrooctyl)-1-trichlorosilane for 3 hr, then coated with a thin layer of PDMS prepolymer. The polymer was cured for 3 hr at 65° C., cut out with a scalpel blade, peeled away from the silicon master, and the inlets and outlets were drilled.

A glass slide (75×50 mm) and the layer of PDMS containing channels were plasma oxidized in a plasma chamber and sealed together. Valve assemblies were fabricated as outlined above. Machine screws (1 mm diameter, 5 mm tall, 0.3 mm pitch) were used as actuators; polyethylene tubing (PE 60, I.D. 0.76 mm, O.D. 1.22 mm, Becton Dickinson) were inserted into the inlet and outlet ports to introduce and expel fluids from the channels.

Example 7

Immunoassays

The following example demonstrates the use of the device of Example 4 to perform an immunoassay. In this example, reservoirs 9-200, 9-201, 9-202, and 9-203 were not used. Reservoir 9-204 was filled with horseradish peroxidase conjugated to goat anti-human IgG (HRP-aIgG) and reservoir 9-205 was filled with alkaline phosphatase conjugated to goat antihuman IgA (AP-aIgA) in blocking buffer using a syringe pump (10 mL/hr). The reservoirs were closed by closing valves 9-47 and 9-48 prior to filling the reservoirs. Reservoir 9-206 was filled with QuantaBlu (Pierce, 15162) and reservoir 9-207 was filled with Attophos (2'-[2-benzothiazoyl]-6'-hydroxybenzothiazole phosphate, Promega). Valves 9-49 and 9-50 prevented the solutions in reservoirs 9-206 and 9-207 from flowing into central channel 9-30 until desired. Valve 9-44 was closed and then reservoir 9-208 was filled with blocking buffer. Reagents in each of the reservoirs were delivered directly to central channel 9-30 when appropriate by opening valves that were disposed between the reservoir and the central channel. For example, to deliver the reagent in reservoir 9-204, valve 9-47 was opened using a small screwdriver and a vacuum was applied to outlet 9-7, or a syringe filled with air was connected to inlet 9-16 of reservoir 9-204.

Figure 9A:
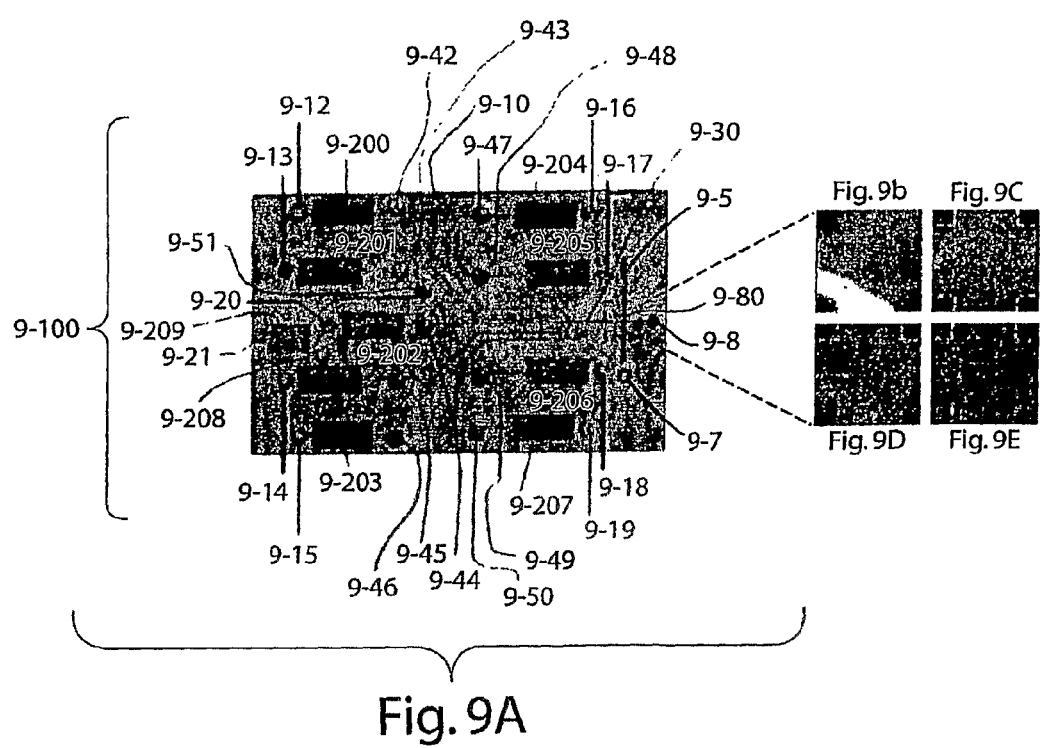
FIG. 9A illustrates, via a black and white photocopy of an optical photograph, a device used for sandwich immunoassays, according to one embodiment of the present invention.

A solution of goat anti-human polyvalent immunoglobulins (Sigma, I1761) (200 microliters) was introduced in the assay junction 9-80 via inlet 9-5. Devices were incubated at 4° C. for 10 hrs to allow the polyvalent immunoglobulins to adsorb onto glass (the floor of the channel), and then purged by applying a vacuum to outlet 9-8. Devices were blocked by passing half of the volume of reservoir 9-208 containing blocking buffer through central channel 9-30. The devices were blocked for 14 hrs at 4° C. and then purged by applying a vacuum to outlet 9-8. To assay human serum for IgA, serum (Golden West Biologicals, 200 microliters) was passed through the assay junction 9-80 via inlet 9-5. The remaining serum was washed out of the junction by releasing a small amount of blocking buffer from reservoir 9-208. AP-aIgA in reservoir 9-205 was then passed through the assay junction. Channel 9-30 and assay junction 9-80 were washed with the remaining blocking buffer, and filled with a solution of Attophos. After 15 min, junction 9-80 was imaged using epifluorescence microscopy. The reaction of Attophos and alkaline phosphatase produced 2'-[2-benzothiazoyl]-6'-hydroxybenzothiazole, a fluorescent molecule with excitation/emission maxima of 435/555 nm. FIG. 9B is an image of epifluorescence produced by the detection of IgA in human serum. To check for non-specific binding of the secondary antibody to the walls of the microchannel, the procedure above was repeated, but instead of flowing human serum through the assay junction, blocking buffer was used. Attophos was released from reservoir 9-207 and was introduced to the junction, and the junction was imaged using epifluorescence microscopy (FIG. 9C).

To assay for IgG, a device similar to the one for assaying IgA was used. The assay junction 9-80 was filled with a solution of goat anti-human polyvalent IgG via inlet 9-5 and then emptied via outlet 9-8. Then, a solution of human IgG (100 microliters, 10 mg/mL) was introduced into inlet 9-5 and passed through the assay junction 9-80. The remaining IgG was removed with a small amount of blocking buffer from reservoir 9-208. Valve 9-47 was opened, releasing the solution of HRP-aIgG in reservoir 9-204, and the contents of the reservoir were passed through junction 9-80. The anti-human IgG was subsequently washed away with the remaining blocking buffer from reservoir 9-208, and the junction filled with a solution of QuantaBlu by releasing the solution from reservoir 9-206. After 90 min, the junction was imaged using epifluorescence microscopy. The product of QuantaBlu and horseradish peroxidase generated a fluorescent product with excitation/emission maxima of 325/420 nm. FIG. 9D is an image of faint epifluorescence produced by the detection of IgG in the sample of human IgG. To check for non-specific binding of the secondary antibody to the microfluidic channel, the conditions above were repeated, but instead of passing a solution of human IgG through the assay junction, blocking buffer was used. QuantaBlu was introduced into the junction, and imaged using epifluorescence microscopy. FIG. 9E shows that no epifluorescence was produced by this background experiment.

Example 8

Storage of Devices

The following example demonstrates that a fluid can be stored in a reservoir (e.g., a μPOPs reservoir) of a device under pressure for prolonged periods of time.

μPOPs reservoirs were filled with 4-6 volumes of red food coloring. The fluid was trapped under pressure in the reservoirs using machine screw valves, and the devices were stored at 4° C. in a humid environment for 40 days. After 40 days, the reservoirs were still filled with liquids under pressure, and no leaks were noticeable. The liquid could be discharged from the μPOPs into the microfluidic channels by opening the valves on the outlet channel. Similar results were obtained for devices that were incubated in a humid environment at room temperature (25° C.), and for devices that were stored at 0° C.

Example 9

Shape of Reservoirs

Figure 11A:
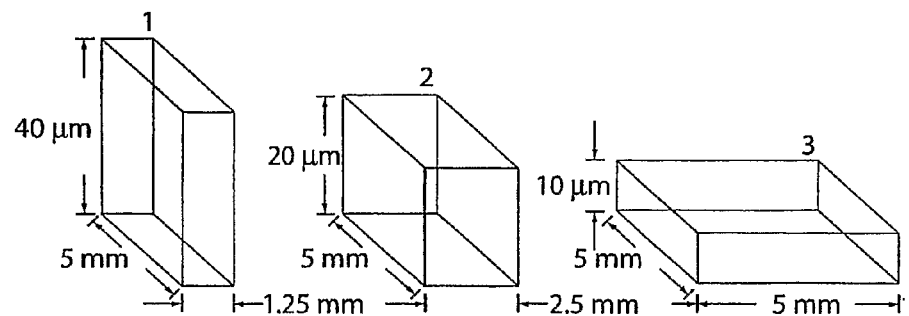
FIG. 11A shows dimensions of reservoirs according to one embodiment of the invention.

The following example demonstrates how the shape of a reservoir (e.g., a μPOPs reservoir) affects the flow rate of fluids pushed out of the reservoir. Several reservoirs fabricated in PDMS having the same volume (250 nL) but with different vertical and horizontal dimensions were placed under pressure. Most of the pressure stored in the μPOPs reservoir may be in the ceiling, i.e., for reservoirs fabricated in PDMS and bonded to a glass slide. (For reservoirs fabricated entirely in PDMS, i.e., reservoirs having walls, ceilings and floors made in PDMS, pressure may be stored predominately in the ceiling and the floor of the reservoir.) μPOPs having narrow ceilings that were deflected at larger angles can store more pressure than μPOPs with wide ceilings that were at smaller angles. FIG. 11A shows the dimensions of the μPOP reservoirs used in these experiments. μPOP 1 has dimensions: length=5 mm, width=1.25 mm, height=40 μl; μPOP 2 has dimensions: length=5 mm, width=2.5 mm, height=20 μL; and μPOP 3 has dimensions: length=5 mm, width=5 mm, height=10 μL.

Figure 11B:
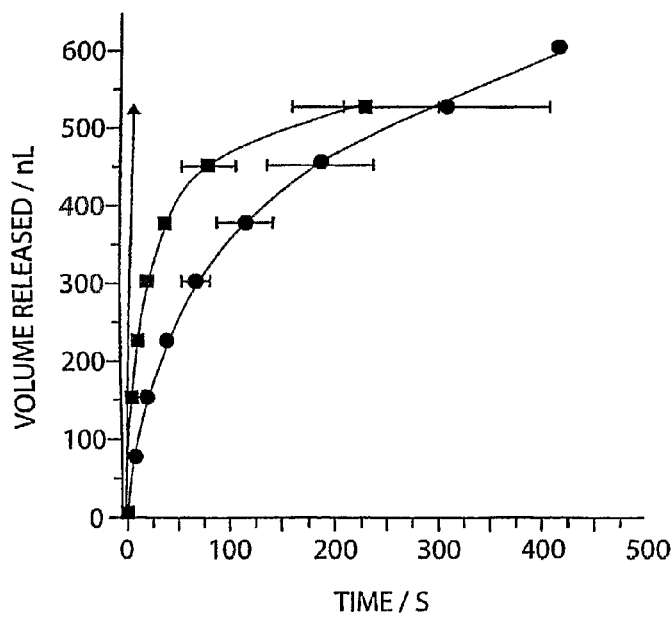
FIG. 11B shows relationships between the volume of fluid released out of the reservoirs of FIG. 11A as a function of time according to one embodiment of the invention.

FIG. 11B shows the rate of flow of fluids stored in μPOPs fabricated in PDMS as a function of the dimensions of the reservoirs shown in FIG. 11A. The μPOPs (volume, 250 nL) were connected to an inlet and outlet channel. The outlet channel was serpentine (length, 20 cm) to enable measurements of volume as a function of time (i.e., by knowing the geometry of the channel, volume of fluid in the channel can be measured). Machine screw valves were integrated into both inlet and outlet channels. The μPOPs were filled with 5 μL of dye and the fluid was stored under pressure by closing the valves on both channels. The valve on the outlet channel was opened and the volume of fluid pushed out of the μPOP was measured over time. FIG. 11B is a plot of the volume pushed out of the μPOP over time. μPOP 1 (▲); μPOP 2 (■); μPOP 3 (●). The profile of the volume of fluid released over time for the μPOP reservoirs with different dimensions indicates that the pressure in the reservoirs is largely stored in the deflection of the ceiling.

Experiments performed with reservoirs of circular geometry having the same volume but with different diameters and/or heights gave similar results to those with rectangular reservoirs.

This example shows that the flow rate of a fluid released from a reservoir can be modified by changing the shape of the reservoir (e.g., a μPOPs reservoir) containing the fluid.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of", when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A microfluidic device, comprising:
    a microfluidic valve assembly comprising a structure defining a microfluidic fluid path having a cross-sectional dimension of less than 1 mm, wherein the structure comprises a deformable material; and
    an actuator integrally connected to at least a portion of the structure such that separation of the actuator from the structure requires at least the use of tools and would cause damage to at least one component of the microfluidic device, the actuator movable between at least a first position causing relatively lesser constriction of the fluid path, a second position causing relatively greater constriction of the fluid path, and a third position causing complete constriction of the fluid path, wherein the actuator, when moved to the second or third position, is able to remain in the second or third position without application of energy to the actuator and without being susceptible to variations in the operable working environment of the assembly.

2. The microfluidic device of claim 1, wherein the actuator is threaded into at least a portion of the structure, and is movable rotationally between at least the first position and the second position.

3. The microfluidic device of claim 1, wherein the fluid path has a rectangular cross-section.

4. The microfluidic device of claim 1, wherein the fluid path has a height greater than or equal to about 20 microns.

5. The microfluidic device of claim 1, wherein the fluid path has a height greater than or equal to about 50 microns.

6. The microfluidic device of claim 1, wherein the fluid path has a height greater than or equal to about 100 microns.

7. The microfluidic device of claim 1, wherein the deformable material is a polymer.

8. The microfluidic device of claim 1, wherein the deformable material is an elastomer.

9. The microfluidic device of claim 1, wherein the deformable material comprises PDMS.

10. The microfluidic device of claim 1, wherein the actuator is a screw.

11. The microfluidic device of claim 1, wherein the actuator has a diameter of less than or equal to about 2 mm.

12. The microfluidic device of claim 1, wherein the actuator has a diameter of less than or equal to about 1 mm.

13. The microfluidic device of claim 1, wherein the actuator has a diameter of less than or equal to about 0.5 mm.

14. The microfluidic device of claim 1, wherein the actuator has a diameter of less than or equal to about 35 times the width of the fluid path.

15. The microfluidic device of claim 1, wherein the actuator has a diameter of less than or equal to about 15 times the width of the fluid path.

16. The microfluidic device of claim 1, wherein the actuator has a diameter of less than or equal to about 10 times the width of the fluid path.

17. The microfluidic device of claim 1, wherein the actuator has a diameter of less than or equal to about 5 times the width of the fluid path.

18. The microfluidic device of claim 1, wherein the actuator deforms the fluid path by applying a physical contact force to at least a portion of the structure.

19. The microfluidic device of claim 1, wherein the actuator is able to constrict the fluid path partially.

20. The microfluidic device of claim 1, wherein the actuator is actuated electrically.

21. The microfluidic device of claim 1, wherein the device can withstand a back-pressure of greater than or equal to about 140 kPa.

22. The microfluidic device of claim 1, wherein at least a portion of the microfluidic fluid path is deformable.

23. The microfluidic device of claim 1, comprising a reservoir adapted and arranged to store elastic potential energy, wherein the reservoir is in fluid communication with the microfluidic fluid path.

24. The microfluidic device of claim 1, wherein the actuator has a diameter greater than the width of the fluid path.

25. The microfluidic device of claim 1, comprising a second actuator integrally connected to at least a portion of the structure, the second actuator movable between at least a first position causing relatively lesser constriction of a microfluidic fluid path of the device, a second position causing relatively greater constriction of the microfluidic fluid path, and a third position causing complete constriction of the microfluidic fluid path, wherein the second actuator, when moved to the second or third position, is able to remain in the second or third position without application of energy to the second actuator and without being susceptible to variations in the operable working environment of the assembly.

26. A microfluidic chip, comprising the microfluidic device of claim 1.

27. The microfluidic device of claim 1, wherein at least a portion of the actuator is embedded in a polymer.

28. The microfluidic device of claim 27, wherein the polymer is polyurethane.

29. The microfluidic device of claim 1, wherein the actuator, when the actuator is moved to the third position, is able to retain a fluid in a reservoir in fluid communication with the microfluidic fluid path.

30. The microfluidic device of claim 29, wherein the fluid comprises an analyte.

31. The microfluidic device of claim 1, comprising a reaction site comprising a component for a chemical and/or biological reaction immobilized therein, wherein the reaction site is in fluid communication with the microfluidic fluid path.

32. The microfluidic device of claim 31, wherein the component is a binding partner.

33. The microfluidic device of claim 1, wherein the actuator is separated from the microfluidic path by a portion of the structure in which the actuator is embedded.

34. The microfluidic device of claim 33, wherein actuator and the microfluidic path are separated by a distance of greater than or equal to 150 microns.

35. A method of restricting flow in a microfluidic fluid path, comprising:
    providing a microfluidic device comprising a structure defining a microfluidic fluid path having a cross-sectional dimension of less than 1 mm and an actuator integrally connected to at least a portion of the structure such that separation of the actuator from the structure requires at least the use of tools and would cause damage to at least one component of the microfluidic device;
    moving the actuator from a first position relative to the microfluidic fluid path, to a second position relative to the fluid path, wherein the second position causes more restriction of flow through the microfluidic fluid path than is caused by the first position; and
    maintaining the actuator in the second position without applying energy to the actuator, wherein the actuator is not susceptible to variations in the operable working environment of the assembly and wherein the actuator is adapted and arranged to constrict the microfluidic fluid path completely.

36. The method of claim 35, wherein at least a portion of the microfluidic fluid path is deformable.

37. The method of 35, further comprising storing a fluid in the microfluidic device by moving the actuator to constrict the microfluidic fluid path completely.

38. The method of claim 35, wherein the microfluidic device comprises a reservoir adapted and arranged to store elastic potential energy.

39. The method of claim 38, comprising storing elastic potential energy in the reservoir.

* * * * *